(12) United States Patent
Madsen

(10) Patent No.: US 10,933,941 B2
(45) Date of Patent: Mar. 2, 2021

(54) REAR WHEEL SUSPENSION SYSTEM FOR A TWO-WHEELED VEHICLE

(71) Applicant: Damon Madsen, Jerome, ID (US)

(72) Inventor: Damon Madsen, Jerome, ID (US)

(73) Assignees: Damon Madsen, Jerome, ID (US); Trina Benson, Hailey, ID (US)

( * ) Notice: Subject to any disclaimer, the term of this patent is extended or adjusted under 35 U.S.C. 154(b) by 0 days.

(21) Appl. No.: 16/840,262

(22) Filed: Apr. 3, 2020

(65) Prior Publication Data

US 2020/0231246 A1    Jul. 23, 2020

Related U.S. Application Data

(63) Continuation-in-part of application No. 15/957,643, filed on Apr. 19, 2018, now Pat. No. 10,745,078.

(60) Provisional application No. 62/487,116, filed on Apr. 19, 2017.

(51) Int. Cl.
*B62K 25/28* (2006.01)

(52) U.S. Cl.
CPC .................. *B62K 25/286* (2013.01)

(58) Field of Classification Search
CPC ...... B62K 25/04; B62K 25/28; B62K 25/286; B62K 25/30
USPC ....................................... 280/283
See application file for complete search history.

(56) References Cited

U.S. PATENT DOCUMENTS

| | | | | |
|---|---|---|---|---|
| 5,452,910 A | * | 9/1995 | Harris ................... | B62K 25/26 280/283 |
| 7,556,276 B1 | * | 7/2009 | Dunlap ................ | B62K 25/286 280/284 |
| 7,661,503 B2 | | 2/2010 | Weagle | |
| 7,815,207 B2 | | 10/2010 | Currie | |
| 8,590,914 B2 | | 11/2013 | Domahidy | |

(Continued)

OTHER PUBLICATIONS

Duda, Conan D. U.S. Appl. No. 15/957,643 Restriction Requirement.

*Primary Examiner* — Ruth Ilan
*Assistant Examiner* — Conan D Duda
(74) *Attorney, Agent, or Firm* — Scott D. Swanson; Shaver & Swanson, LLP

(57) ABSTRACT

An improved rear suspension for a two wheeled vehicle. The improved rear suspension includes a rear triangle connected to a wheel. The rear triangle is connected to the front triangle by an upper linkage. A biasing member, such as a shock absorber, typically a spring and damper, is connected to the front triangle and functionally connected to the rear triangle, either directly or indirectly. The rear triangle is further connected to the front triangle by a pivoting connection. The pivoting connection can be a eccentric pivot. Alternatively the pivoting connection can be a pivot connection located on the front triangle and a pivot connection located on the rear triangle and connected by a lower linkage. The performance of the suspension can be measured by an anti squat/instant center path line that begins forward of the bottom bracket and at or near the height of the uppermost chain ring radius and moves toward the rear axle, as the line moves toward the rear axle the line curves upward toward the seat of the bicycle and progressively curves to form a more pronounced curve upward making a verticality of the line and a hook shape of the line overall.

20 Claims, 36 Drawing Sheets

(56) References Cited

U.S. PATENT DOCUMENTS

| | | |
|---|---|---|
| 9,061,729 B2 | 6/2015 | Canfield |
| 9,145,185 B1 | 9/2015 | Claro |
| 9,242,693 B2 | 1/2016 | Voss |
| 2003/0038450 A1* | 2/2003 | Lam ..................... B62K 25/286 280/284 |
| 2004/0070169 A1* | 4/2004 | Lesage ................. B62K 25/286 280/284 |
| 2004/0239071 A1* | 12/2004 | Chamberlain ....... B62K 25/286 280/284 |
| 2004/0256834 A1* | 12/2004 | Whyte ................. B62K 25/286 280/283 |
| 2005/0057018 A1* | 3/2005 | Saiki .................... B62K 25/286 280/284 |
| 2005/0067806 A1* | 3/2005 | Weagle ................. B62K 25/28 280/124.1 |
| 2005/0156402 A1* | 7/2005 | Carroll .................. B62K 25/28 280/284 |
| 2006/0022428 A1* | 2/2006 | Whyte ................. B62K 25/286 280/283 |
| 2006/0022429 A1 | 2/2006 | Ellsworth et al. |
| 2006/0071442 A1* | 4/2006 | Hoogendoorn ...... B62K 25/286 280/275 |
| 2006/0181053 A1* | 8/2006 | Huang ................. B62K 25/286 280/284 |
| 2006/0225942 A1* | 10/2006 | Weagle ................. B62K 25/24 180/357 |
| 2007/0108725 A1* | 5/2007 | Graney ................ B62K 25/286 280/284 |
| 2008/0067772 A1* | 3/2008 | Weagle ................ B62K 25/286 280/124.134 |
| 2008/0217882 A1* | 9/2008 | Beaulieu ................ B62K 25/28 280/261 |
| 2009/0072512 A1* | 3/2009 | Earle .................... B62K 25/286 280/283 |
| 2009/0315296 A1* | 12/2009 | Berthold .............. B62K 25/286 280/284 |
| 2010/0059965 A1 | 3/2010 | Earle |
| 2010/0102531 A1* | 4/2010 | Graney ................. B62K 25/286 280/284 |
| 2010/0156066 A1* | 6/2010 | O'Connor ............. B62K 25/30 280/283 |
| 2011/0140387 A1* | 6/2011 | Andal .................. B62K 25/286 280/124.133 |
| 2011/0227312 A1* | 9/2011 | Earle .................... B62K 25/20 280/283 |
| 2011/0233892 A1 | 9/2011 | Domahidy |
| 2012/0126506 A1* | 5/2012 | Zawistowski ........ B62K 25/286 280/275 |
| 2014/0001729 A1* | 1/2014 | Hudec ................... B62K 25/28 280/283 |
| 2014/0210180 A1* | 7/2014 | Hudak .................. B62K 13/08 280/274 |
| 2015/0251724 A1* | 9/2015 | Hudec ........................ B62J 1/02 280/283 |
| 2016/0257371 A1* | 9/2016 | Droux ................... B62K 25/28 |
| 2016/0257373 A1* | 9/2016 | Emura ..................... B62M 6/50 |
| 2018/0099723 A1* | 4/2018 | Rojo Vidal ............ B62K 19/18 |
| 2018/0265165 A1* | 9/2018 | Zawistowski ........ B62K 25/286 |
| 2019/0248443 A1* | 8/2019 | Yi .......................... B62K 25/30 |

* cited by examiner

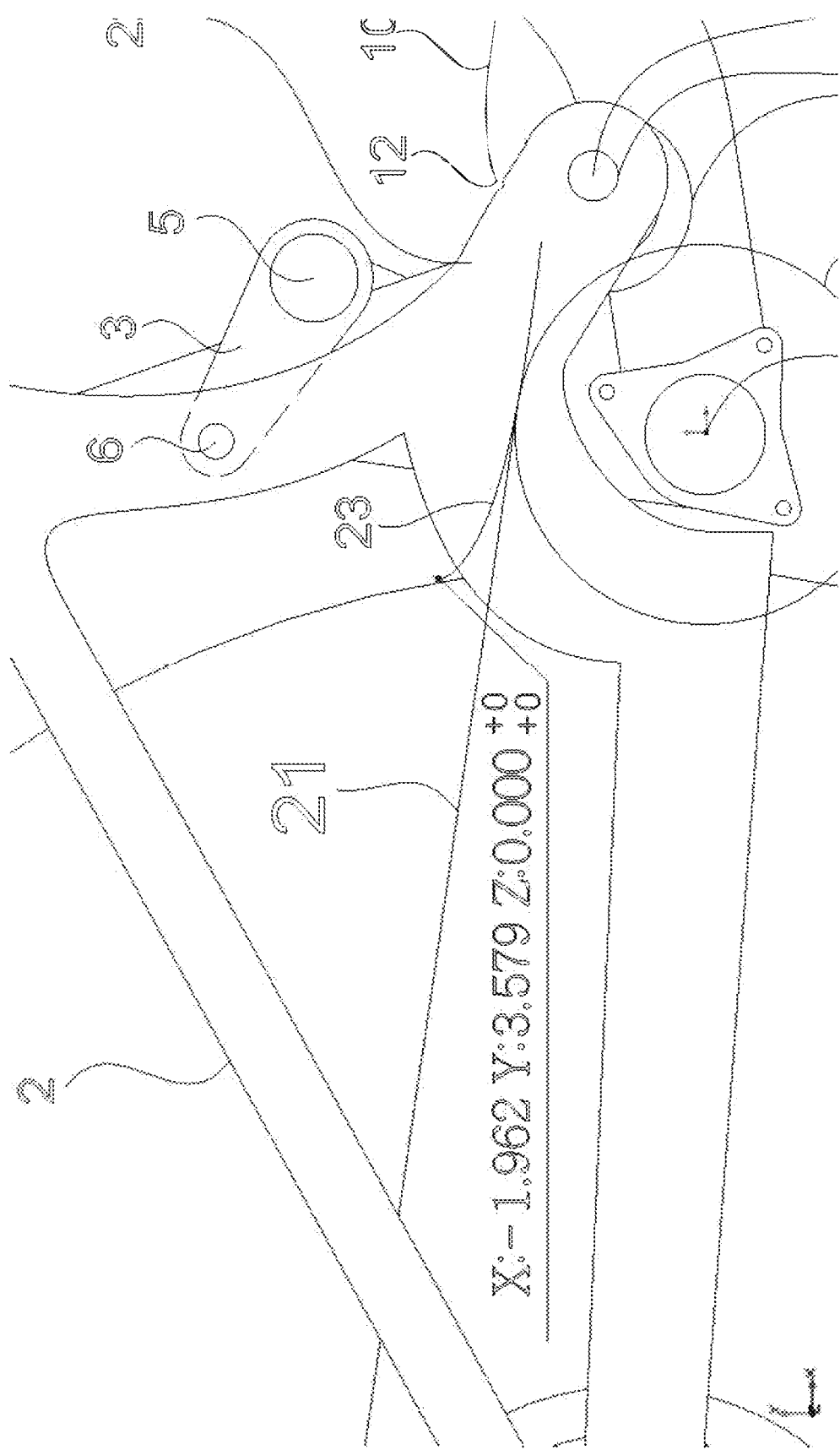
figure 1a vertex

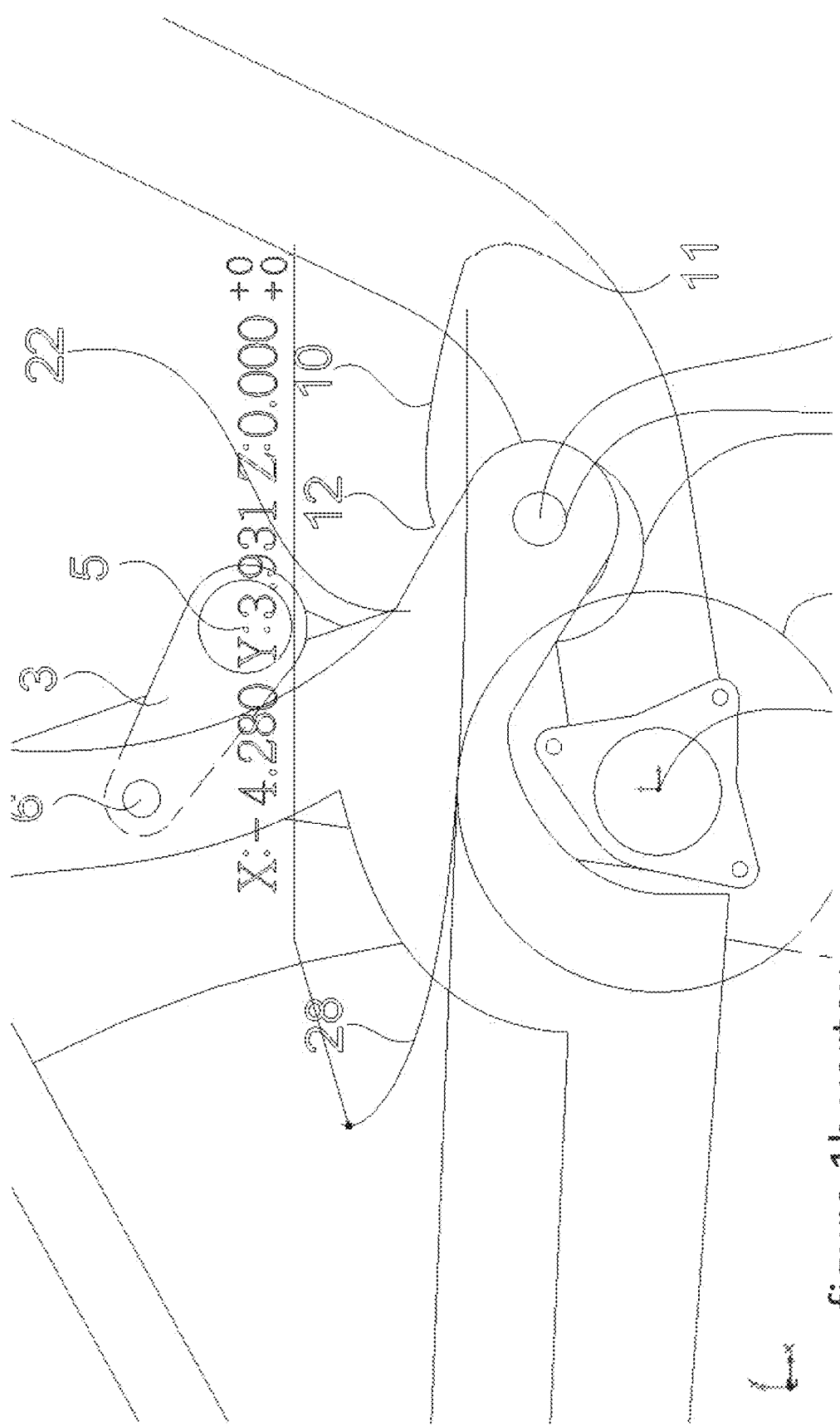

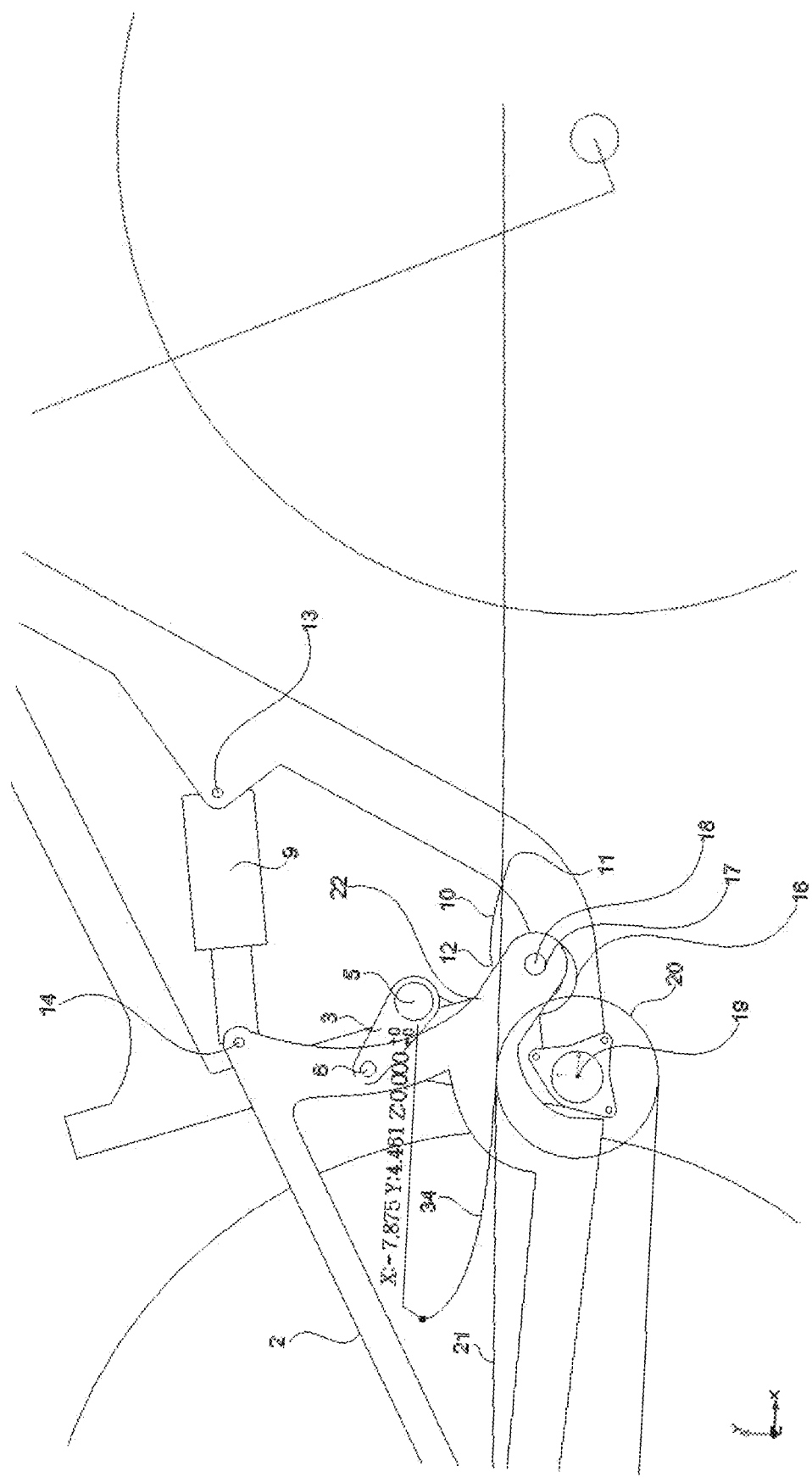

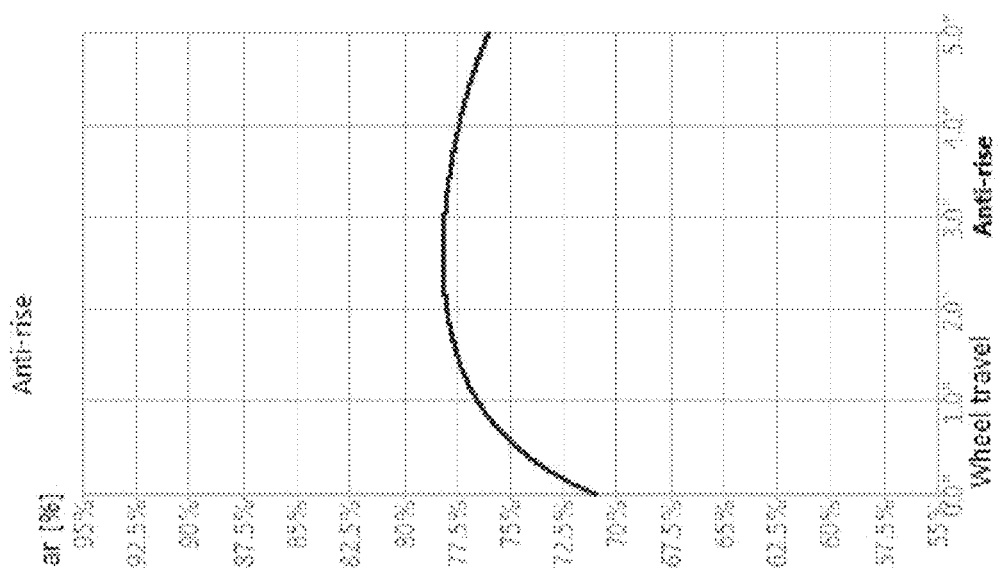

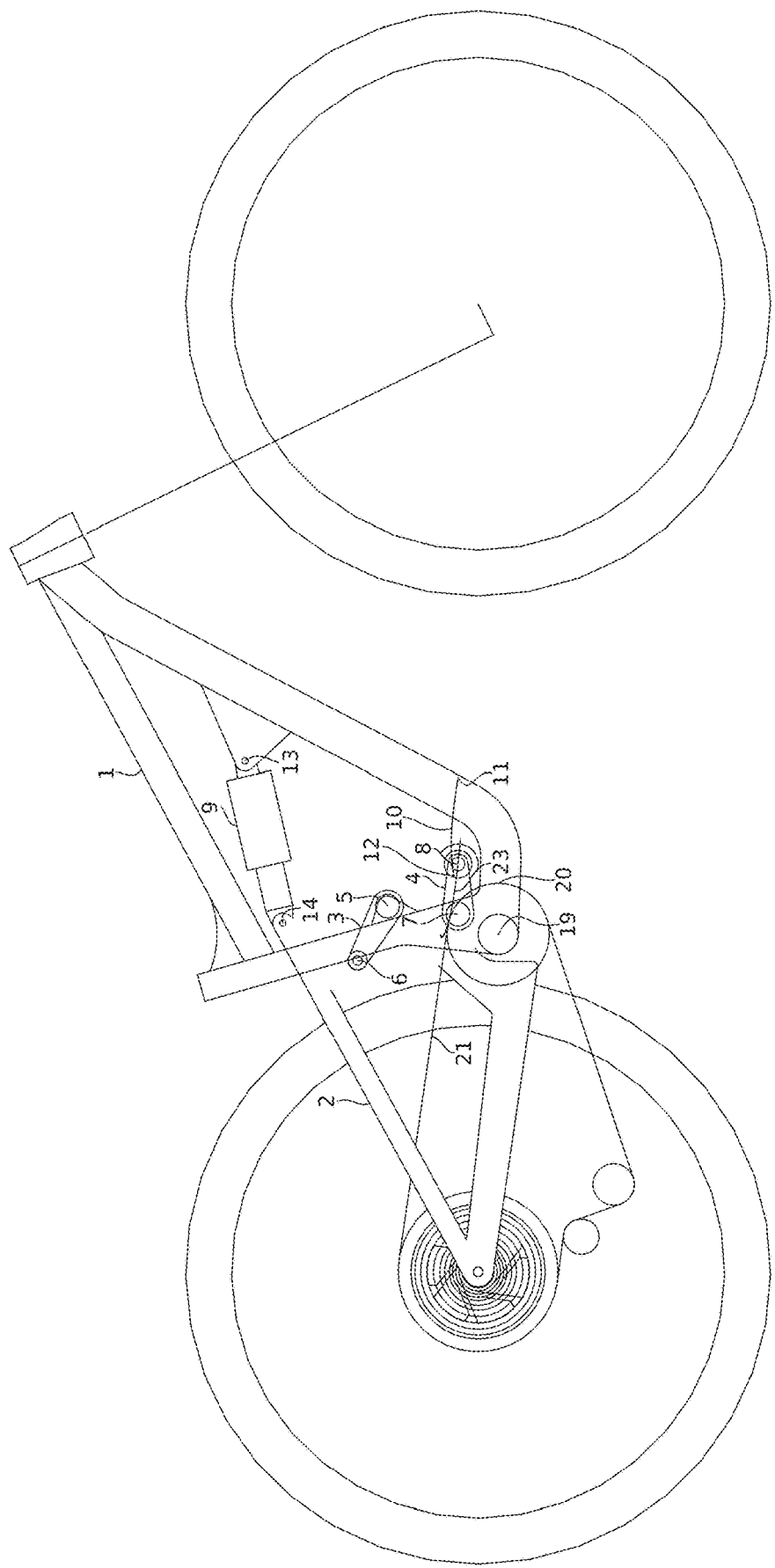

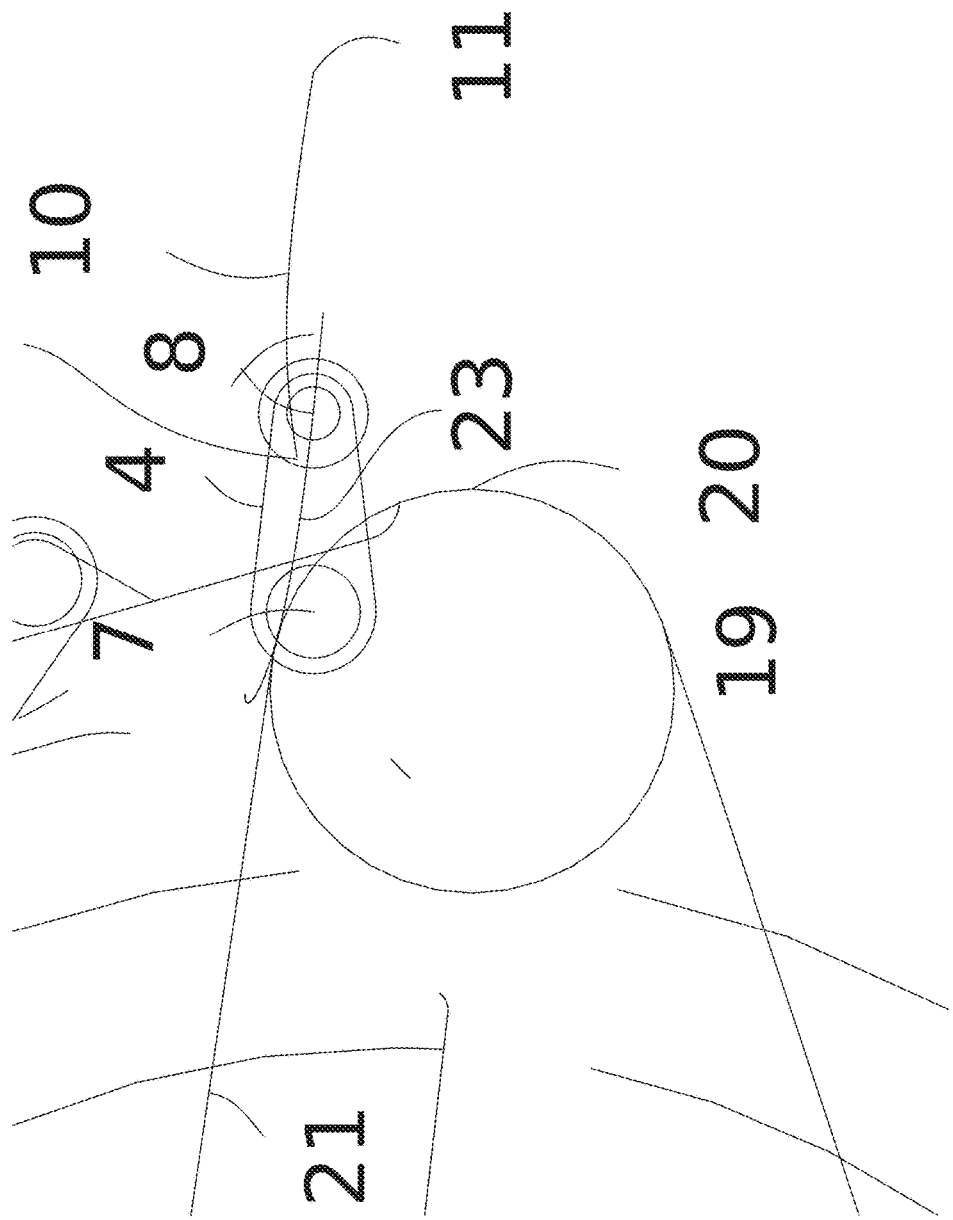

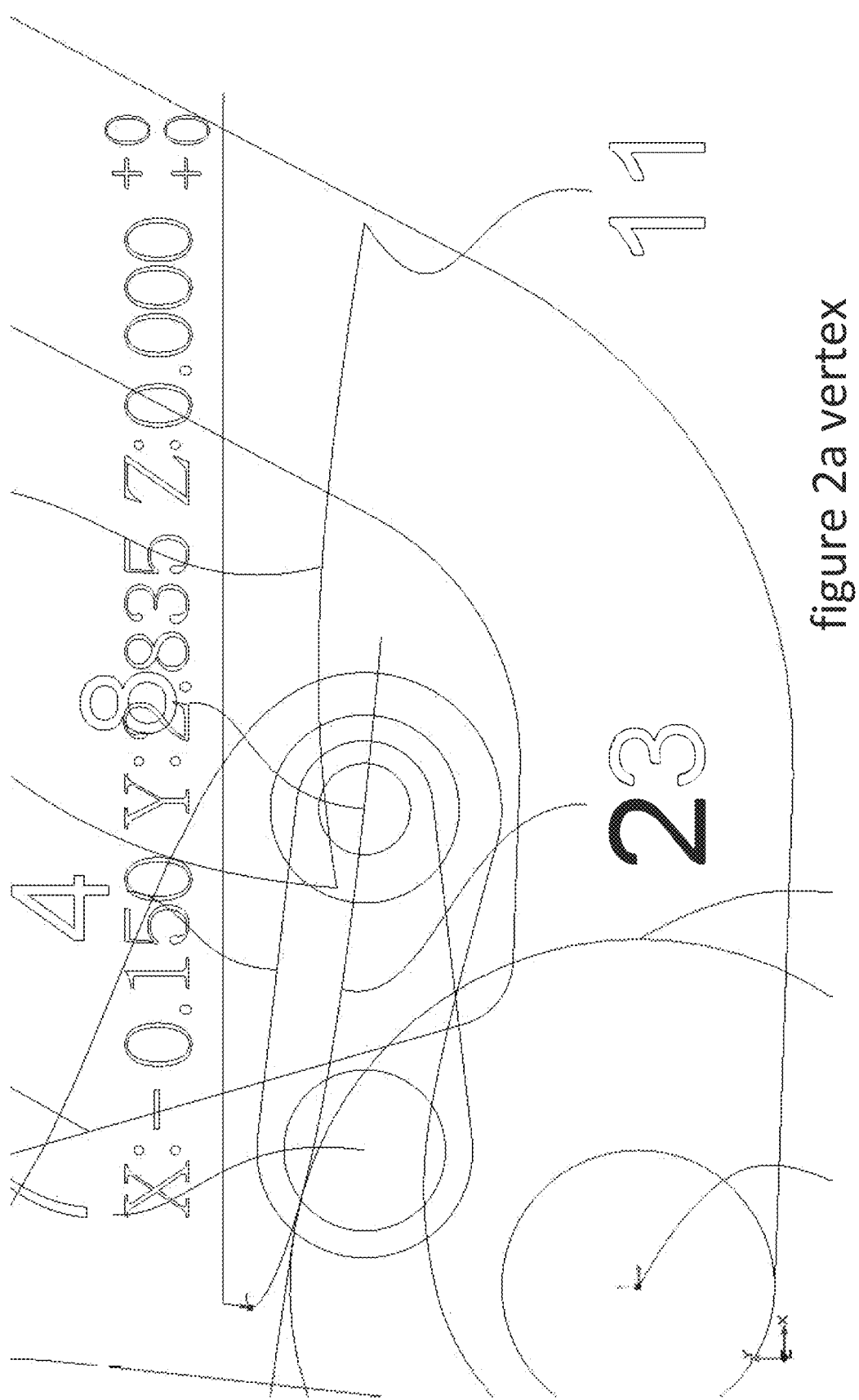
figure 2a vertex

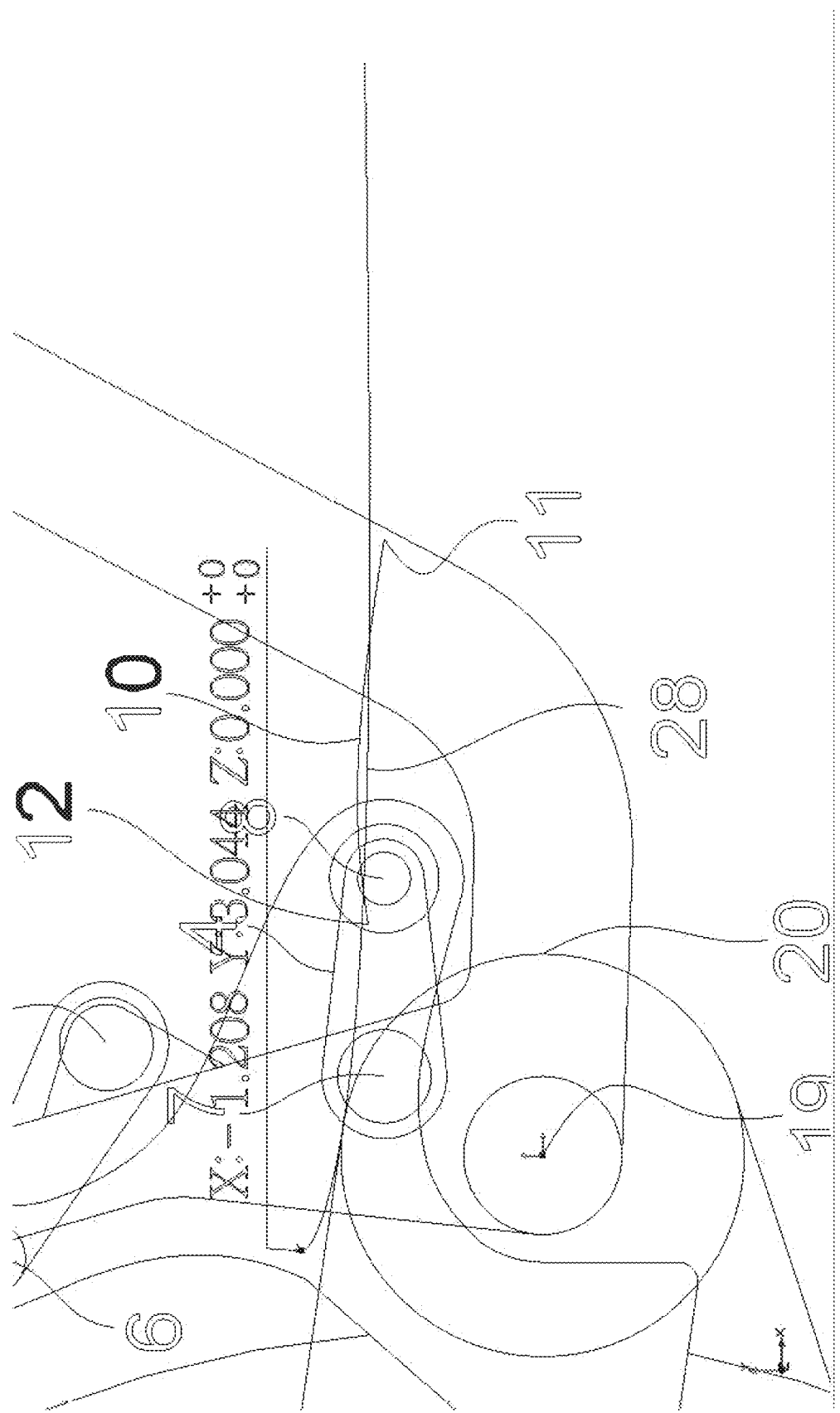

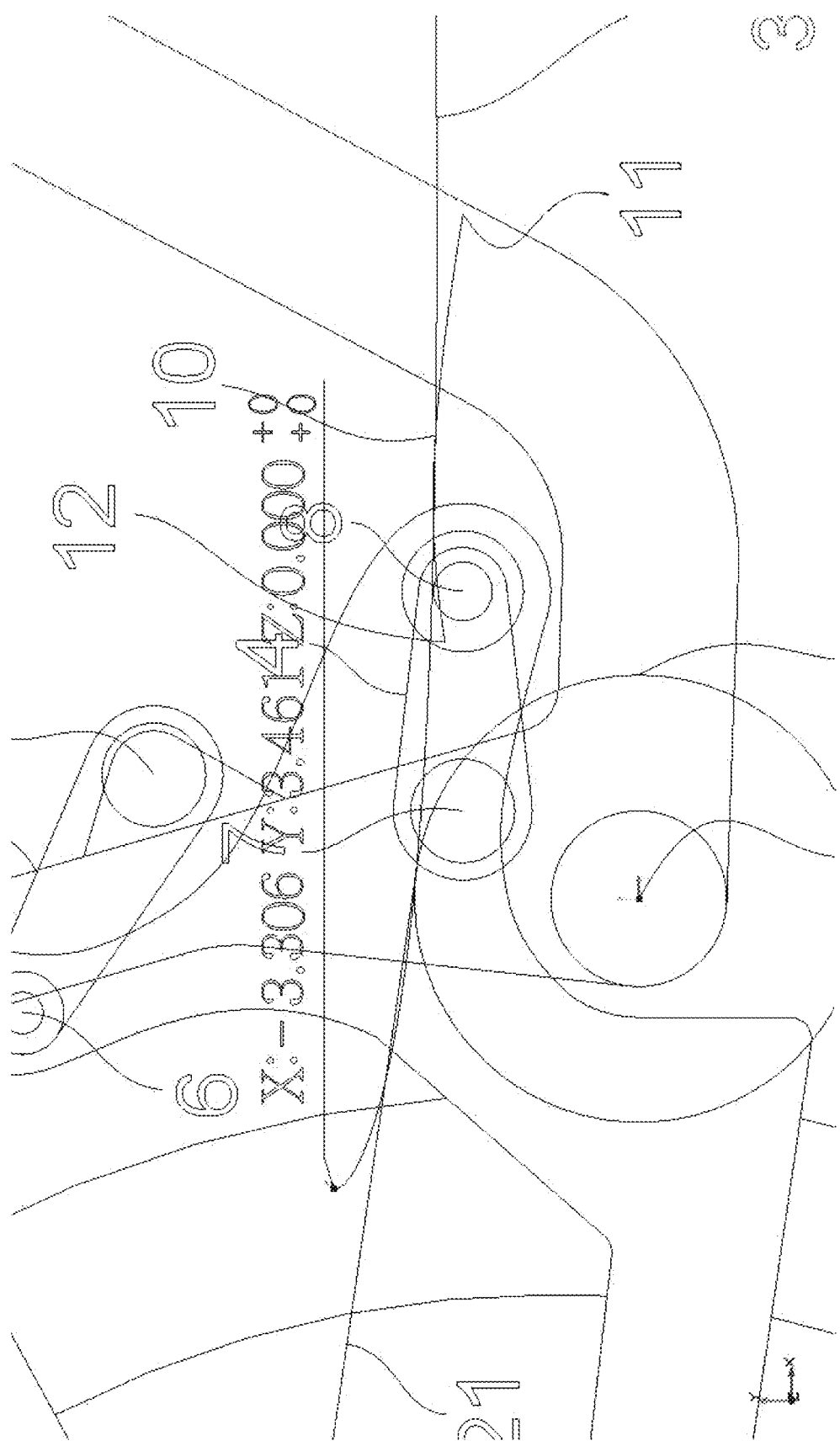
figure 2c vertex

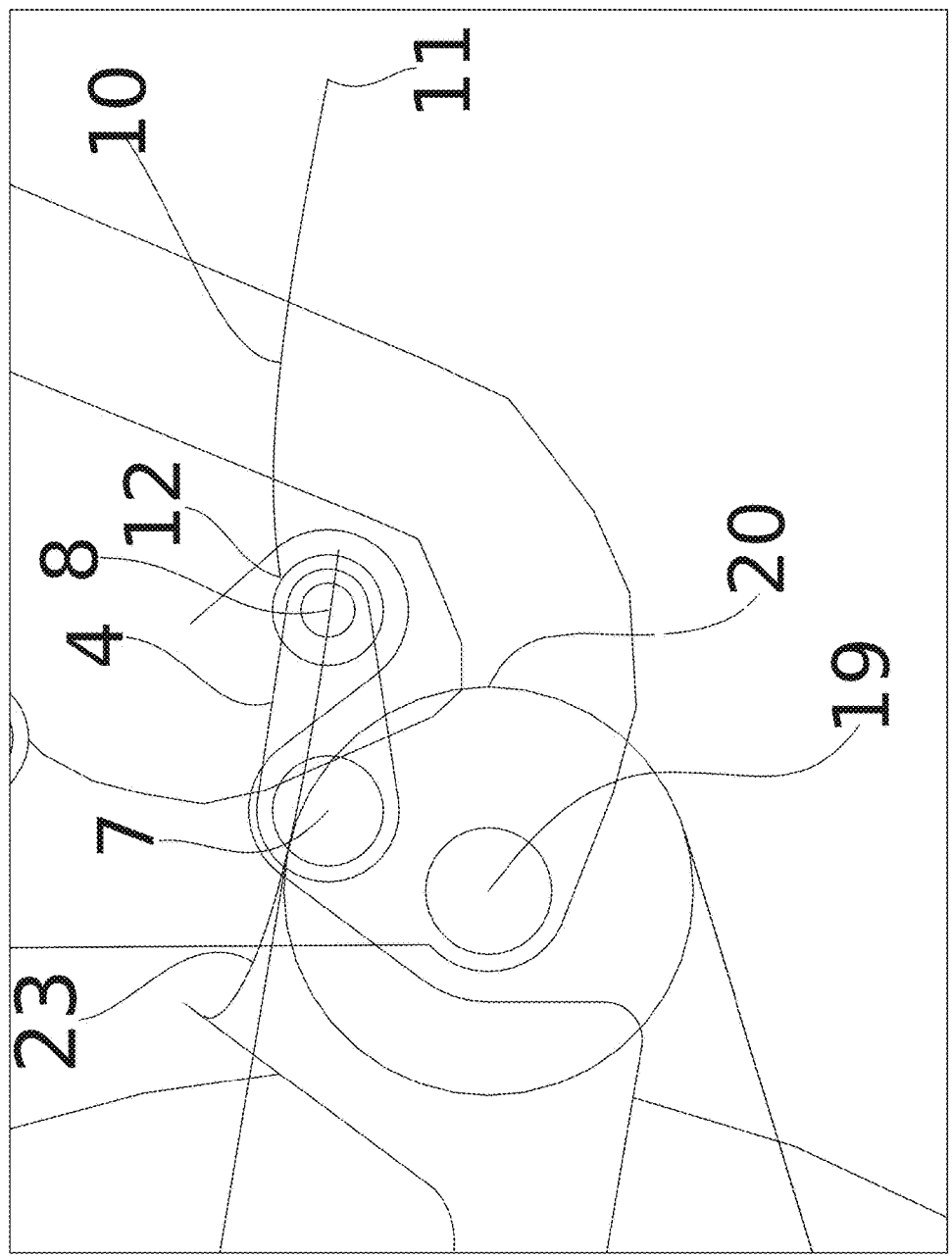

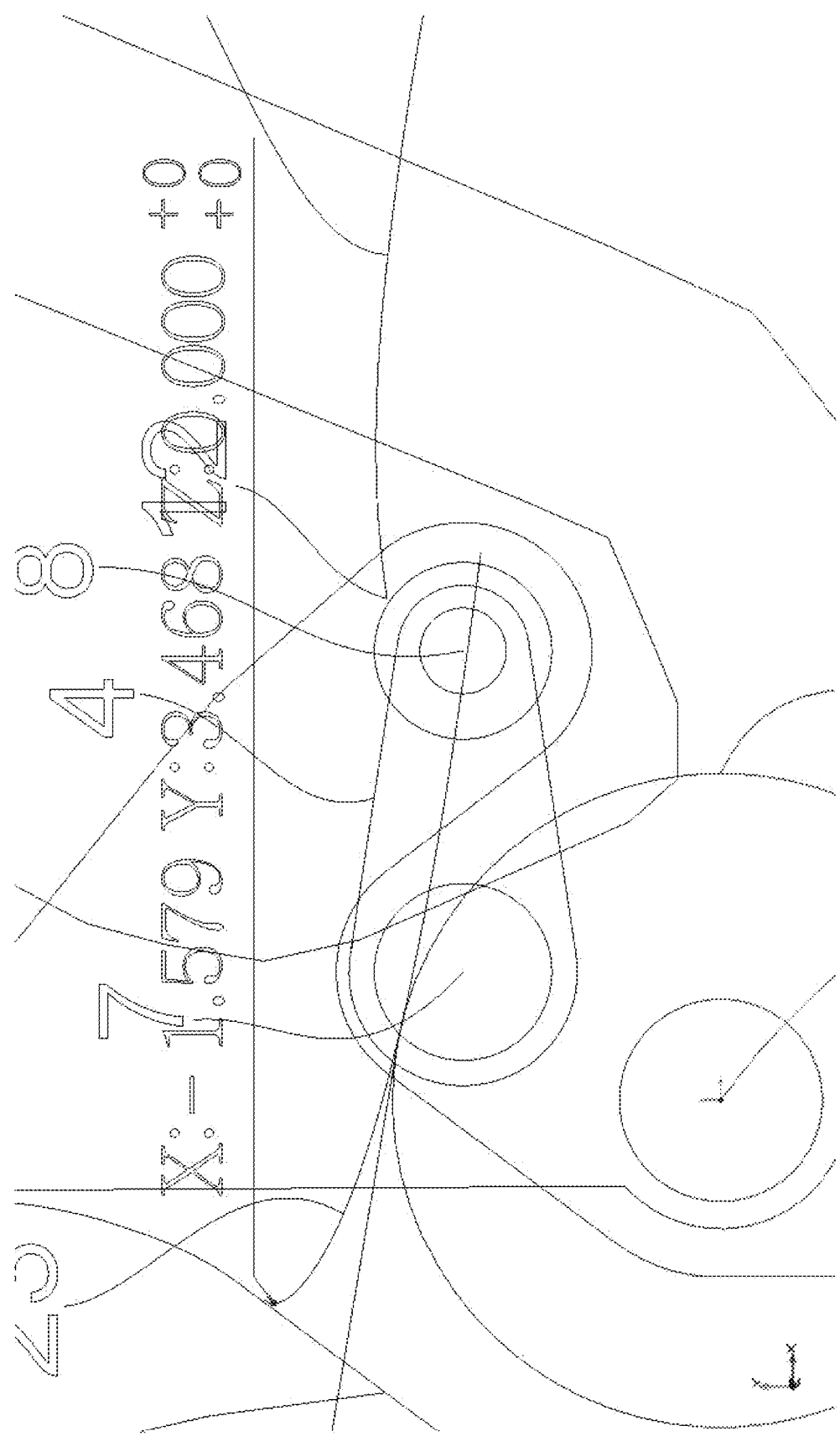
figure 3a vertex

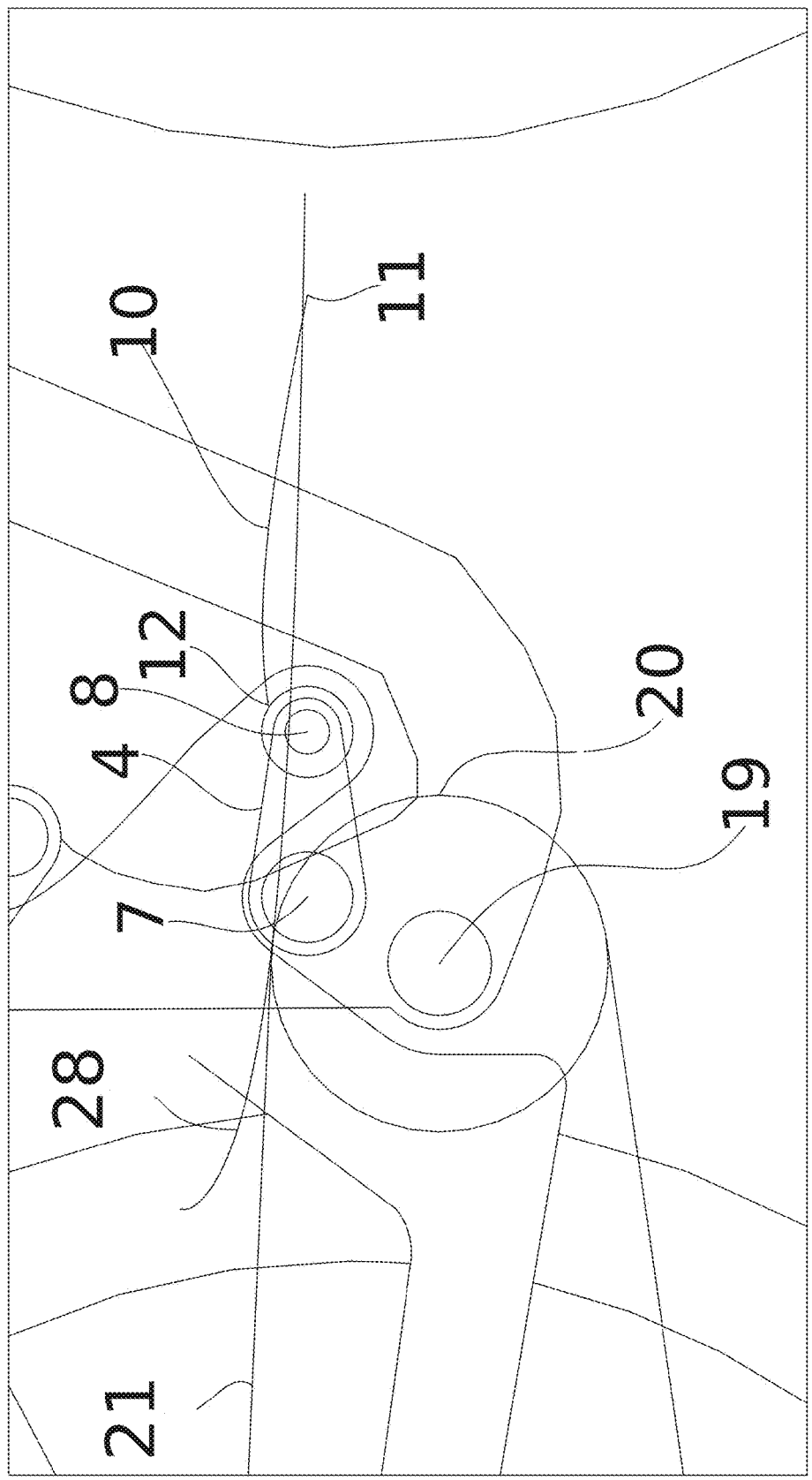

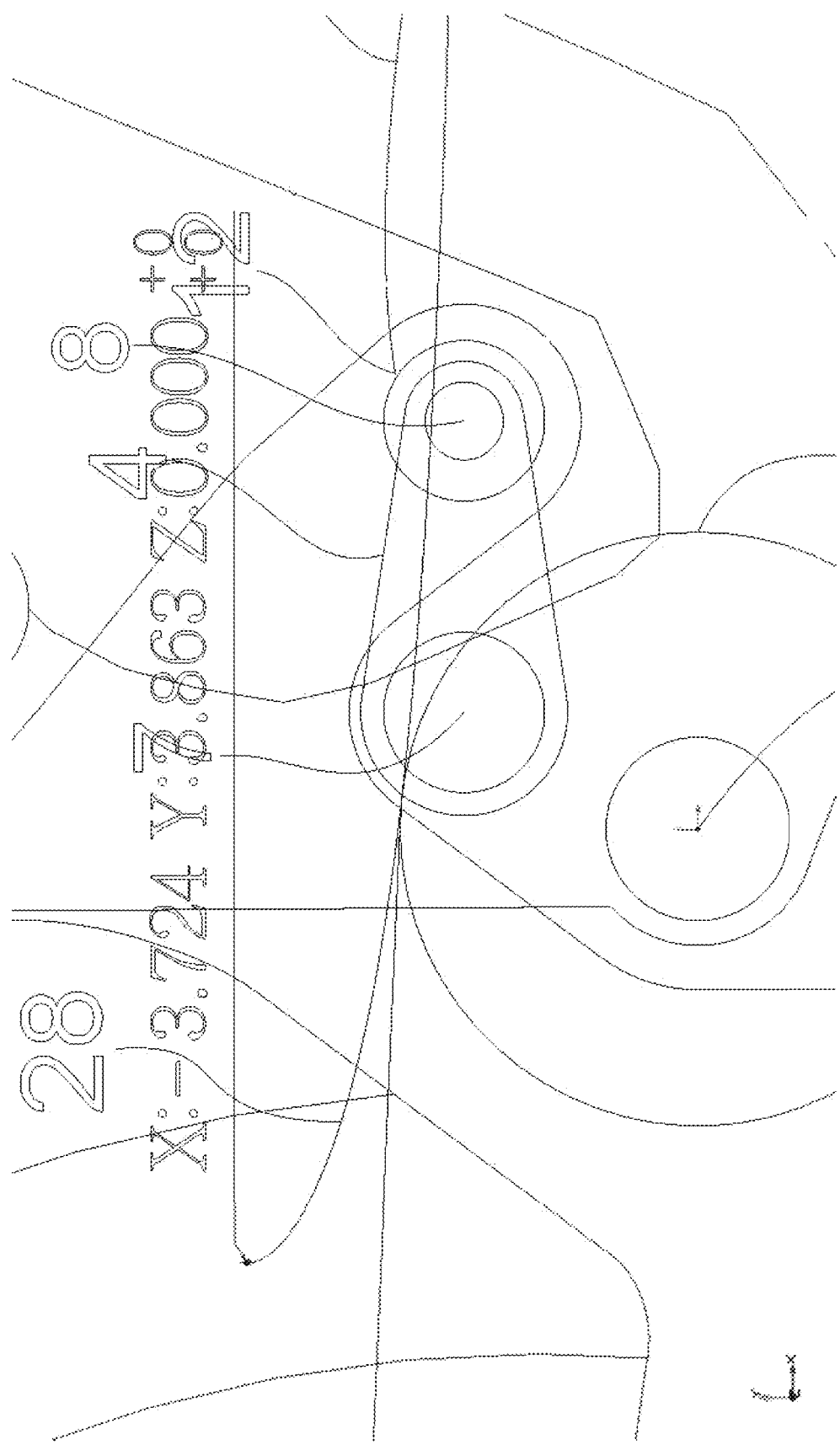
figure 3b vertex

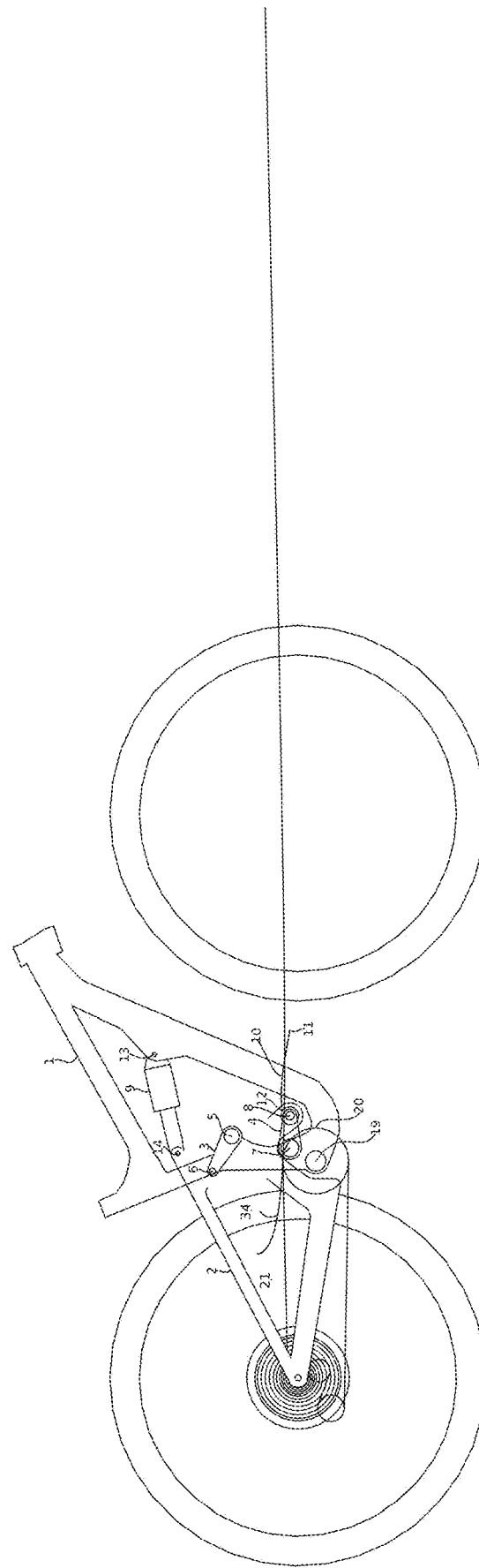

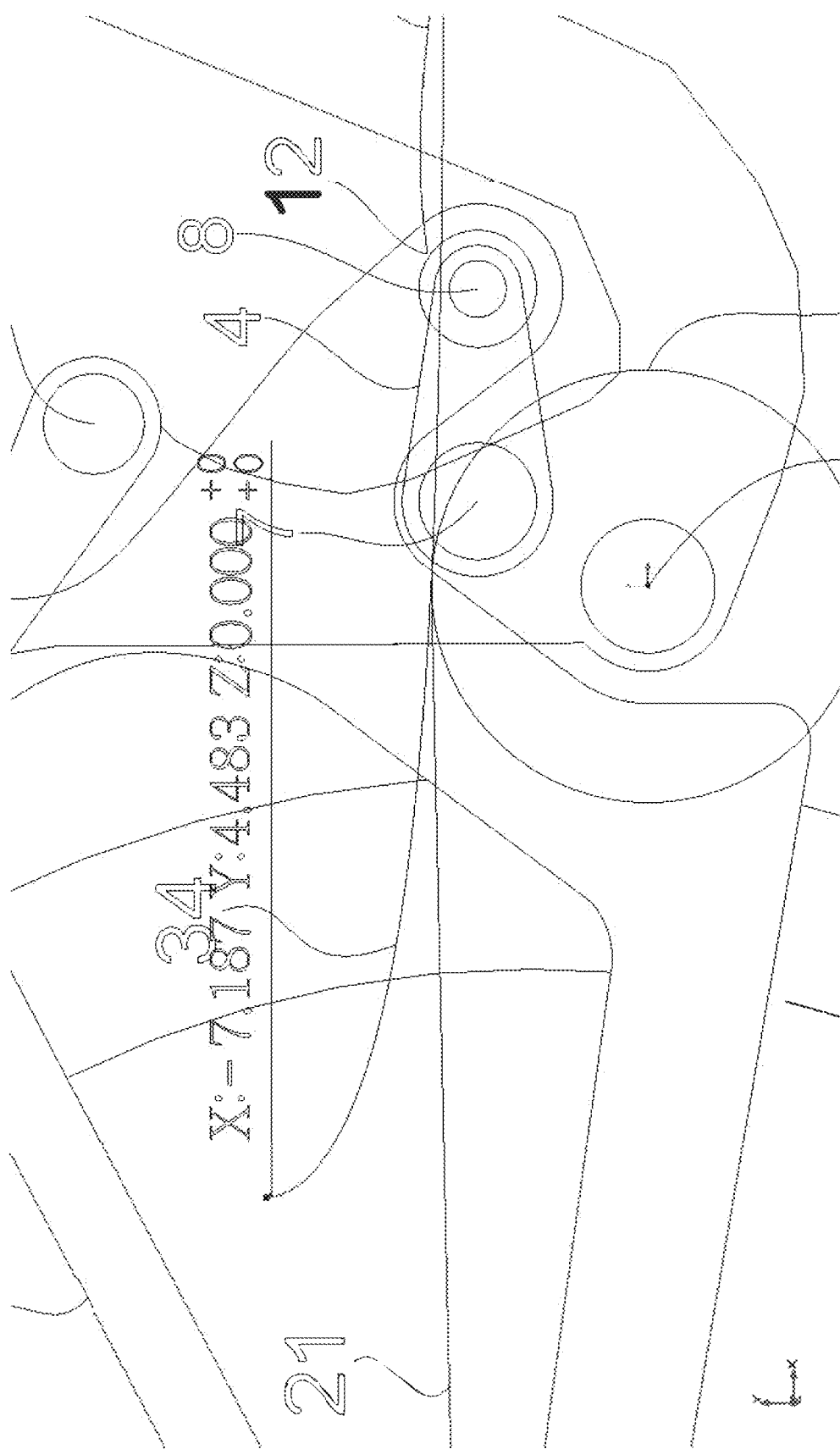
figure 3c vertex

REAR WHEEL SUSPENSION SYSTEM FOR A TWO-WHEELED VEHICLE

PRIORITY/CROSS-REFERENCE TO RELATED APPLICATIONS

This application claims the benefit of U.S. Nonprovisional application Ser. No. 15/957643 filed Apr. 19, 2018, which claims the benefit of U.S. Provisional Application No. 62/487,116 filed Apr. 19, 2017, the disclosure of each of which is incorporated by reference.

TECHNICAL FIELD

The disclosure generally relates to the field of the invention relates generally to a rear wheel suspension system. The suspension system is particularly useful for a two-wheeled vehicle such as but not limited to a bicycle or mountain bike.

BACKGROUND INFORMATION

Mountain biking is a very popular sport throughout the United States and the world. In order to provide a more comfortable ride, mountain bike riders often will ride dual suspension bicycles. Dual suspension bicycles have a biasing member (often called a shock absorber) at the front of the frame to dampen biasing member generated by the front wheel and a biasing member absorber connected to the main frame and/or rear frame (generally the rear triangle) of the bicycle to dampen biasing member from the rear wheel of the bicycle. The latter is generally called a rear suspension bicycle. A rear suspension bicycle utilizes a linkage system to link the rear triangle of the bicycle to the main frame of a bicycle in combination with a biasing member absorber. The arrangement of this linkage system directly affects the performance of the rear suspension of the bicycle. Thus, the rear suspension can be designed in a variety of layouts for a variety of purposes.

A prime concern when designing a rear suspension system is to assess the performance of the rear suspension for an intended use of a bicycle bearing that suspension. For example, in a bicycle designed for traveling both uphill and downhill, an ideal design will allow the rear suspension to provide sufficient dampening of shock while traveling downhill, yet minimize the negative effects caused by the rear suspension when a mountain bike rider is traveling uphill. These negative effects include, for example, the tendency of a rear suspension bicycle to compress under acceleration, which creates inefficiency in pedaling as force is lost due to the compression of the rear suspension, and in some designs the tendency of the shock absorber to extend and exert force upward on the mountain bike rider.

Bicycle suspension uses chain tension from pedaling to prevent the suspension from compressing when accelerating forward. Most bicycle suspension systems have used chain tension to counteract suspension sagging under acceleration since the early years of 1990's bike suspension design. The use of chain tension to achieve equilibrium in a suspension system is not new, however different degrees of equilibrium have been achieved. Equilibrium is subjective; what one feels is equal is not always the same feeling of equal to someone else. In a mathematical equation, equilibrium should be the equal amount of chain force to counteract the equal amount of weight shift that causes suspension sag during acceleration. Use of chain tension to prevent sag is called anti-squat. Anti-squat thus seeks to maximize the efficiency of the rear suspension by seeking to maximize the amount of pedaling or acceleration energy translated into forward motion. Thus a bike with a high anti-squat has a lower tendency of the shock absorber to compress while a bicycle with too high of anti-squat has a tendency of the shock absorber to exert force in the opposite direction of compression, also known as extending.

However, maximizing anti-squat can come at a disadvantage in that if a bicycle has too much anti-squat, it can lead to an extension of the rear shock in response to a user pedaling and/or pedal kickback when the suspension compresses when a user is accelerating over bumps in the trail.

To measure the anti-squat principles of a bicycle or other wheeled vehicle, the instant center (or "IC") of the rear suspension is measured. The instant center of a bicycle has a common meaning in the bicycle industry, but in general is defined as an imaginary point about which the rear axle is rotating around at any given instant. The IC moves or migrates as the rear suspension compresses. Thus a popular method for determining the anti-squat is to graph the suspension. Theoretically 100% anti-squat should put a suspension system in equilibrium. The assembly of the rear suspension is designed in order to provide an IC migration, and thus anti-squat behavior, in response to a given condition. Thus an ideal bicycle rear suspension for a bicycle utilized for both uphill and downhill riding, such as cross country riding, that is supple and shock absorbent when traveling downhill yet efficient and feels as close to "locked", or in performance terms as similar to a bicycle lacking a rear suspension, as possible when under either pedal power or motor power. In general a line denoting the IC across the range of compression of a bicycle suspension indicates a stiffer suspension across compression if the line moves up and/or back whereas an IC line moving down and typically forward indicates a less stiff suspension.

Unfortunately systems today do not operate at 100% anti-squat and the ones that have come close to operating at equilibrium suffer from too much pedal kickback, too much chain growth, and too much chain tension. This prevents the sag during acceleration while stiffening the suspension system (to varying degrees) while pedaling, which prevents the suspension from absorbing an obstacle when the rear wheel encounters them. For example, if a rider is pedaling through rough terrain, the suspension is not as efficient and responsive to the bumps. This means the suspension lacks suppleness. Ideally the riders' biomechanics work with the machine instead of against it.

Where anti squat is accomplished by the arrangement of pivot points to cause chain tension to pull down on the rear wheel during acceleration to prevent squat, anti rise is accomplished by the arrangement of pivot points to cause rear braking forces to compress the rear suspension when braking to prevent the rear of the vehicle from rising. This is due to the weight shift of the center of gravity forward on the vehicle caused by deceleration.

Anti rise is measured using a graphing method similar to the graphing method used to measure anti squat. The method for measuring anti squat is as follows:
1. Draw a line from the rear axle to the instant center (IC) of the wheel carrier member relative to the front triangle (for a single pivot, the IC is the main pivot and for a four bar linkage, it is the intersection of lines through the two intermediate links.)
2. Draw a line through the upper chain line.
3. Note the intersection of line 1 and 2. This point is known as chain line-IC line intersection, and these points form the anti squat-instant center path line.

4. Draw a line from the rear wheel contact patch, through point 3, and extend it over the front axle.
5. Draw a vertical line through the front axle.
6. Note the intersection point of line 4 and line 5, and compare it to the height of the center of gravity, and the height of the rear wheel contact patch. If the point in step 6 is at the same height as the center of gravity of the suspended mass, then the bike has 100% anti squat at that point in travel. If the point is at the same height as the rear wheel contact patch then the bike has 0% anti squat at that point in travel. If the point falls between or outside of this range the anti squat percentage can be calculated by interpolation/extrapolation.

The method for graphing anti rise is as follows:
1. Draw a horizontal line through the center of gravity
2. Draw lines through the links to locate the instant center (IC) point that corresponds to the position of the rear axle at its location in suspension travel as it moves through the rear suspension travel.
3. Draw a vertical line straight up from the front wheel contact point at the ground through the front axle and intersect with line 1. The intersection of line 1 and line 3 is noted as 100% and the point of line 3 at the ground in noted as 0%
4. Draw a line from the rear wheel contact point from the ground through the IC point that corresponds with the position of the rear axle as it travels through the suspension travel, and have the line intersect with line 3.
5. Use the intersection of line 4 and line 3 to calculate the percentage of anti rise at the given position the rear axle is in as it moves through the suspension travel. Example, if the intersection is at the 100% point then the anti rise is 100% and if it is half way between the 100% point and 0% point then the anti rise is 50%.

Theoretically 100% anti rise would equal brake neutrality, but in actuality less percentage feels and works better for two reasons. Firstly, too much anti rise will cause the suspension to compress too much which causes the suspension to stiffen up. Secondly, too little anti rise will cause the suspension to extend under braking conditions causing it to stiffen up. The percentage range that the inventor believe works best is between 50% and 90%. In addition the inventor has found that the anti rise graph needs to have a positive slope. This is because the positive slope helps create a stable anti rise percentage, that, like anti squat the anti rise graph shows the rear wheel compressing. The positive slope also creates the effect of the rear suspension wanting to resist extending under the weight shift of the mass shifting forward caused by braking. The rear suspension wants to remain in a state of equilibrium, whereas an anti rise with a negative slope does not. A rear suspension with a negative slope wants to rise and cannot resist the weight shifting forward during braking. It also has the tendency to have unstable anti rise percentages as the bike is ridden, causing spikes or dips in the anti rise percentage as both the front and rear suspension cycle through their suspension travel In application Ser. No. 15/957643 filed Apr. 19, 2018 the inventor disclosed a series of bicycle suspension arrangements sharing common features that provided improved performance. These suspension arrangements are different in that the linkage efficiency equals comfort while creating suppleness. This efficiency creates a stable anti-squat as well as stable anti-rise. Most suspension systems only look at the rear wheel compressing, and ignore the front suspension compressing with the rear wheel compressing. The Applicant's suspensions provide ample performance both when the front suspension comes into contact with an obstacle then the rear wheel encounters the same obstacle, we are looking at the bike as a whole. These suspensions further take into consideration that as the rider pedals, causing their weight to shift up and down while the rider's weight also shifts back during acceleration, it causes anti squat values to change as the suspension compresses.

SUMMARY OF THE DISCLOSURE

The purpose of the Summary is to enable the public, and especially the scientists, engineers, and practitioners in the art who are not familiar with patent or legal terms or phraseology, to determine quickly from a cursory inspection, the nature and essence of the technical disclosure of the application. The Summary is neither intended to define the inventive concept(s) of the application, which is measured by the claims, nor is it intended to be limiting as to the scope of the inventive concept(s) in any way.

While application Ser. No. 15/957643 explained the beneficial characteristics, the inventor has since deduced how to calculate and graph this improved performance of the bicycle suspension such that varying suspension components and/or arrangement has the same affect. This is obtained by providing an anti squat/instant center path line (how to calculate and graph is discussed below), that has a similar shape and curvature throughout all of the gears of the suspension. This anti squat/instant center path line begins forward of the bottom bracket and around the height of the chain ring radius and moves toward the rear axle and as the line moves toward the rear axle the line curves upward toward the seat of the bicycle and as the line starts to end there is a more pronounced curve upward making a verticality of the line and a somewhat hook shape of the line overall.

A bicycle suspension system that incorporates this anti squat/instant center path line can be utilized on a two-wheeled vehicle, such as a bicycle or motorcycle. The rear wheel suspension system has a rear triangle coupled to a rear wheel. The rear triangle is connected to a front triangle by an upper linkage. The rear triangle is connected to the upper linkage by a first upper pivot member. The front triangle is connected to the upper linkage by a second upper pivot member.

The front triangle is further pivotally connected to the rear triangle at a rear triangle pivot point on the rear triangle generally in front of or even with a forward circumference point of said chainring. The term forward is in reference to the two wheeled vehicle in an upright position. This connection can be a eccentric pivot. Alternatively this connection can utilize a lower linkage. The rear triangle being connected to the lower linkage at the rear triangle pivot point. The lower linkage being connected to the front triangle at a front triangle pivot point.

A bottom is bracket mounted to the front triangle. The bottom bracket is structured to house a pedal assembly. The bottom bracket has a chainring mounted on the bottom bracket so as the center of the chainring is at the center of said bottom bracket.

The suspension system includes a biasing member connected to the front triangle and functionally connected to the rear triangle. The biasing member is structured to be compressed in response to a force applied to the rear wheel. The biasing member is commonly referred to as a shock absorber in the industry. The biasing member can be directly connected to the rear triangle. Alternatively the biasing member can be functionally connected to the rear triangle via the upper linkage. In an embodiment the upper linkage is in a triangular shape to provide connection between the biasing member, the rear triangle and the front triangle. The biasing member can be in a generally vertical orientation or in a generally horizontal orientation depending on the overall orientation of the rear wheel suspension system, or an orientation somewhere in between without departing from the scope of the invention.

The IC line path generated by the some embodiments starts in front of the chain ring radius and is approximately (some start slightly below, some start slightly above and some start at) the height of the chain ring radius. As the rear suspension compresses the IC moves toward the rear of the vehicle. The height increases as the IC moves toward the rear. In some embodiments the IC tappers off which leads to the leveling of the path line and in some instances may even decrease the height slightly and will only happen towards the end of the path. The first IC line path will have a general shape of a line in front of the chain ring radius that appears concave and the start of the line is lower in height than the end of the line. In other embodiments the second IC path line starts in front of the chain ring radius and about the height of the top of the chain ring radius. The line moves towards the rear of the vehicle and as it does it increase in height forming a line that has a convex curved line and the start point of the line is lower in height than the end point of the line. The third IC path line will have the general shape of a line in front of the chain ring radius that appears concave with the beginning of the line being approximately the same height as the top height of the chain ring radius starting higher than the end point of the line. The shape of all three line paths will produce an anti rise curve that has a positive slope. The concave IC path lines will produce an anti rise curve between the values of 55% and 79%. The anti rise graph line will increase exponentially for the first part of travel and will then continue to level off (for example; the anti rise graph that increase exponentially and levels off that starts around 70% and end around 79% will have an average running value off 70% with values dipping around 65% and spiking around 75%). In some instances the line may decrease slightly by 3% at the end of the line. The convex IC path line will produce an anti rise graph line that has a fairly consistent positive slope. The line will start around 81% and end around 91%.

The aforementioned IC path lines will produce an anti squat/instant center path line that is shaped as follows; the line starts in front of the bottom bracket around the height of the chain ring radius and moves towards the rear of the vehicle in a convex manner. As it curves upward towards the seat at the end of the line there is a more pronounced vertical curve upwards. This produces a line that has a generally J shaped bend at the end. This anti squat/instant center path line will produce an anti squat curve that has a positive slope. The curve will increase exponentially for more than 50% of the rear suspension travel and then start to level off. Depending on the gear, it may decrease slightly at the last 25% of travel. Anti squat/instant center path lines of this shape will produce a more stable and consistent anti squat value as the vehicle is being ridden. Each of these anti squat/instant center path lines can be defined as having a bottom half or little more than half of a parabola that opens toward the front wheel. Each anti squat/instant center path line starts in front of the chainring radius and has its vertex at least 0.150 inches behind the bottom bracket and 2.835 inches above the bottom bracket, but no more than 8.1 inches behind the bottom bracket and 4.7 inches above the bottom bracket.

When considering front and rear suspension anti squat values will present differently than the values indicated on the anti squat graph of just the rear wheel compressing. By using the graphing method we have determined that the line (here to referred to as the anti squat/instant center line) created by the intersection points created by drawing a line from the rear axle to the instant center and drawing a line tangent to the tops of the rear cog and chain ring (aka the chain line) should have the shape of a line starting forward of the bottom bracket and around the height of the chain ring radius and moves toward the rear axle and as the line moves toward the rear axle the line curves upward toward the seat of the bicycle and as the line starts to end there is a more pronounced curve upward making a verticality of the line and a somewhat hook shape of the line overall.

This curve creates resistance to the biomechanics of the rider. As a rider pedals down the mass of the rider is being pushed up. This creates a bobbing effect that does not involve the center mass shifting back during acceleration. By having the curve increase exponentially past the 50% mark and then gradually leveling off we are able to create a resistance to the bobbing effect. This counter balance creates the rear suspension staying in equilibrium. As the front and rear suspension compresses (or cycles) the numbers stay more consistent within a 10-30% change in value. The exponential growth slows at the end.

This equilibrium exists in all gears of a bicycle having a rear cassette with multiple gears (meaning multiple different shaped chain rings). The utilization of a curve that has exponential growth of the curve followed by tapering at the end of the curve prevents spikes and helps manage pedal kickback. In regard to exponential growth the graph runs in the middle of the percentage, as opposed to being between extreme.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

BRIEF DESCRIPTION OF THE DRAWINGS

FIG. 1av is an illustration of the vertices of the anti squat/instant center line path illustrated in FIG. 1a.

FIG. 1bvis an illustration of the vertices of the anti squat/instant center line path illustrated in FIG. 1b.

FIG. 1cv is an illustration of the vertices of the anti squat/instant center line path illustrated in FIG. 1c.

FIG. 1d is the anti rise graph produced from the IC (instant center) of the embodiment in FIG. 1.

FIG. 2av is an illustration of the vertices of the anti squat/instant center line path illustrated in FIG. 2a.

FIG. 2bv is an illustration of the vertices of the anti squat/instant center line path illustrated in FIG. 2b.

FIG. 2cv is an illustration of the vertices of the anti squat/instant center line path illustrated in FIG. 2c.

FIG. 2e is the anti squat graph produced by the embodiment in FIG. 2 for the lowest gear and the highest gear of the vehicle drivetrain.

FIG. 3av is an illustration of the vertices of the anti squat/instant center line path illustrated in FIG. 3a.

FIG. 3bv is an illustration of the vertices of the anti squat/instant center line path illustrated in FIG. 3b.

FIG. 3cv is an illustration of the vertices of the anti squat/instant center line path illustrated in FIG. 3c.

FIG. 3e is the anti squat graph produced by the embodiment in FIG. 3 for the lowest gear and the highest gear of the vehicle drivetrain.

DETAILED DESCRIPTION OF THE EXEMPLARY EMBODIMENTS

Figure 1:
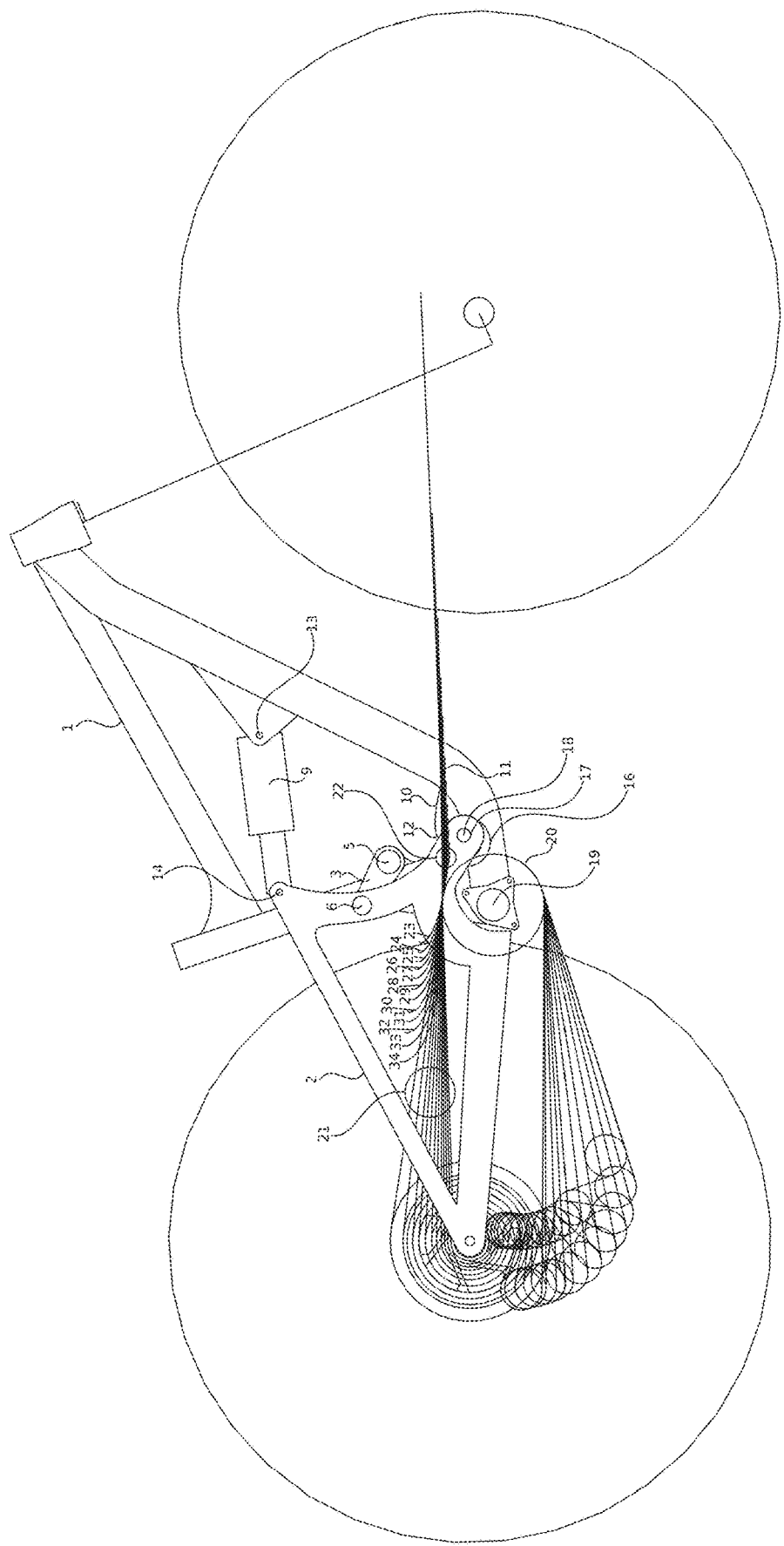
FIG. 1 is an illustration of a preferred embodiment of the invention.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined herein.

In the following description and in the figures, like elements are identified with like reference numerals. The use of "e.g.," "etc," and "or" indicates non-exclusive alternatives without limitation unless otherwise noted. The use of "including" means "including, but not limited to," unless otherwise noted.

FIG. 1 is an illustration of an embodiment of the invention. The embodiment of FIG. 1 has a front triangle 1 with a bottom bracket 19 and a rear triangle 2. The rear triangle 2 is connected to the front triangle 1 by the upper link 3 and an eccentric pivot 16 and the rear biasing member 9. The front pivot point 5 of the upper link 3 connects the upper link to front triangle 1 and the rear pivot point 6 of upper link 3 connects the rear triangle 2 to the upper link. The forward point 18 of the eccentric pivot 16 connects the eccentric pivot to the rear triangle 2 and the eccentric pivot 16 is connected to front triangle 1 at point 17. Eccentric pivot point 18 is in front of bottom bracket 19 and is generally in line or in front of the radius of the front chain ring 20 that rotates around the bottom bracket 19. The rear biasing member 9 is connected to the front triangle 1 at connection point 13 and is connected to the rear triangle 2 at connection point 14. Reference character 21 in the drawings denotes an endless chain in various positions. When an imaginary line is drawn through rear pivot point 6 of the upper link 3 and front pivot point 5 of upper link and an imaginary line is drawn through eccentric connection point 17 and eccentric connection point 18 an intersecting point of these two imaginary lines is formed and denotes the IC of FIG. 1 when the biasing member 9 is in an non-compressed state. As the suspension system compresses the eccentric pivot rotates counter clockwise, causing the forward point 18 of the eccentric pivot to move upwards and the rear pivot point 6 of the upper link to move forward.

If imaginary lines are drawn through the pivot points 6 and 5 of the upper link 3 and through points 17 and 18 of the eccentric pivot 16 throughout the range of movement as the suspension compresses the IC can be plotted forming an IC path line 10 with an IC start point 11 and an IC end point 12. The IC path line starts in front of the front chainring 20 generally the same height as the radius of chainring 20 and moves rearward and upwards as the suspension compresses. This produces a group of anti squat/instant center path lines 22 for the entire gear range that are shaped as follows; the lines starts in front of the bottom bracket around the same height as the chainring radius and moves towards the rear of the vehicle in a convex manner. As the lines curve upward towards the seat at the end of the lines there are a more pronounced vertical curve upwards. This produces lines that has a j shaped bend at the end. Anti squat/instant center path line 23 is the path line produced with the front chainring and a 50 tooth count rear cog. Anti squat/instant center path line 24 is the path line produced with the front chainring and a 42 tooth count rear cog. Anti squat/instant center path line 25 is the path line produced with the front chainring and a 36 tooth count rear cog. Anti squat/instant center path line 26 is the path line produced with the front chainring and a 32 tooth count rear cog. Anti squat/instant center path line 27 is the path line produced with the front chainring and a 28 tooth count rear cog. Anti squat/instant center path line 28 is the path line produced with the front chainring and a 24 tooth count rear cog. Anti squat/instant center path line 29 is the path line produced with the front chainring and a 21 tooth count rear cog. Anti squat/instant center path line 30 is the path line produced with the front chainring and a 18 tooth count rear cog. Anti squat/instant center path line 31 is the path line produced with the front chainring and a 16 tooth count rear cog. Anti squat/instant center path line 32 is the path line produced with the front chainring and a 14 tooth count rear cog. Anti squat/instant center path line 33 is the path line produced with the front chainring and a 12 tooth count rear cog. Anti squat/instant center path line 34 is the path line produced with the front chainring and a 10 tooth count rear cog. Each of these anti squat/instant center path lines can be defined as having a bottom half or little more than half of a parabola that opens toward the front wheel. Each anti squat/instant center path line starts in front of the chainring radius and has its vertex at least 0.150 inches behind the bottom bracket and 2.835 inches above the bottom bracket, but no more than 8.1 inches behind the bottom bracket and 4.7 inches above the bottom bracket.

Figure 1A:
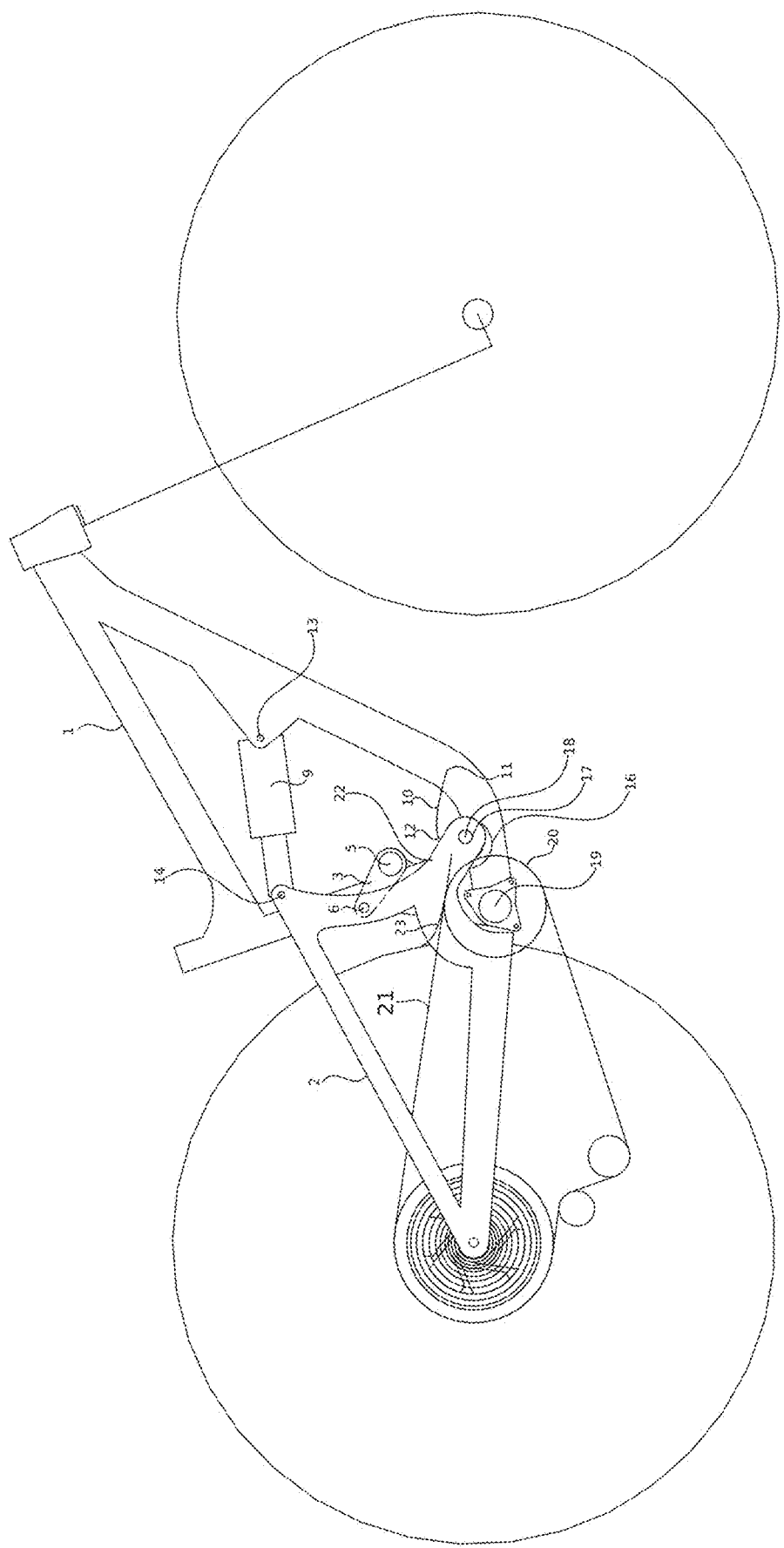
FIGS. 1ai and 1a are an illustration of the embodiment of FIG. 1 with the anti squat/instant center path line with the chain in the lowest gear (50 tooth cog) of the rear cassette.
Figure 1A:
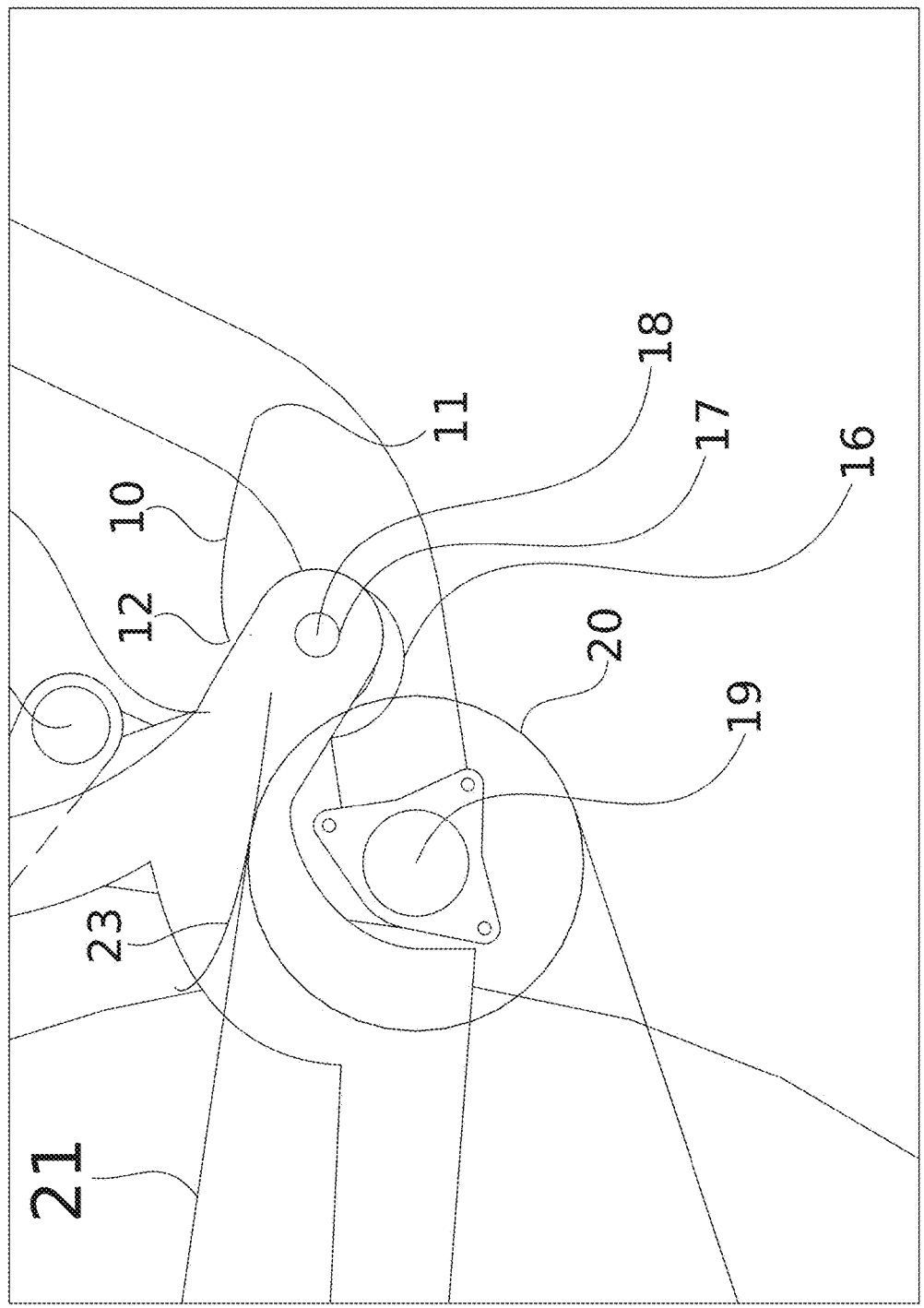

FIG. 1*a* is an illustration of the embodiment in FIG. 1 with the anti squat/instant center path line 23. Anti squat/instant center path line 23 in produced in the lowest gear range, 32 tooth chainring and a 50 tooth cog (or gear of the rear cassette). FIG. 1*a* is a close up of anti squat/instant center path line 23. Each of the following figures illustrates the X and Y coordinates of the location of the ending point of the anti squat/instant center path line in each respective gear. Each Figure includes a view illustrating the X and Y coordinates relative to the origin of the X axis and Y axis at the center of the chain ring attached to the bottom bracket.

Figure 1B:
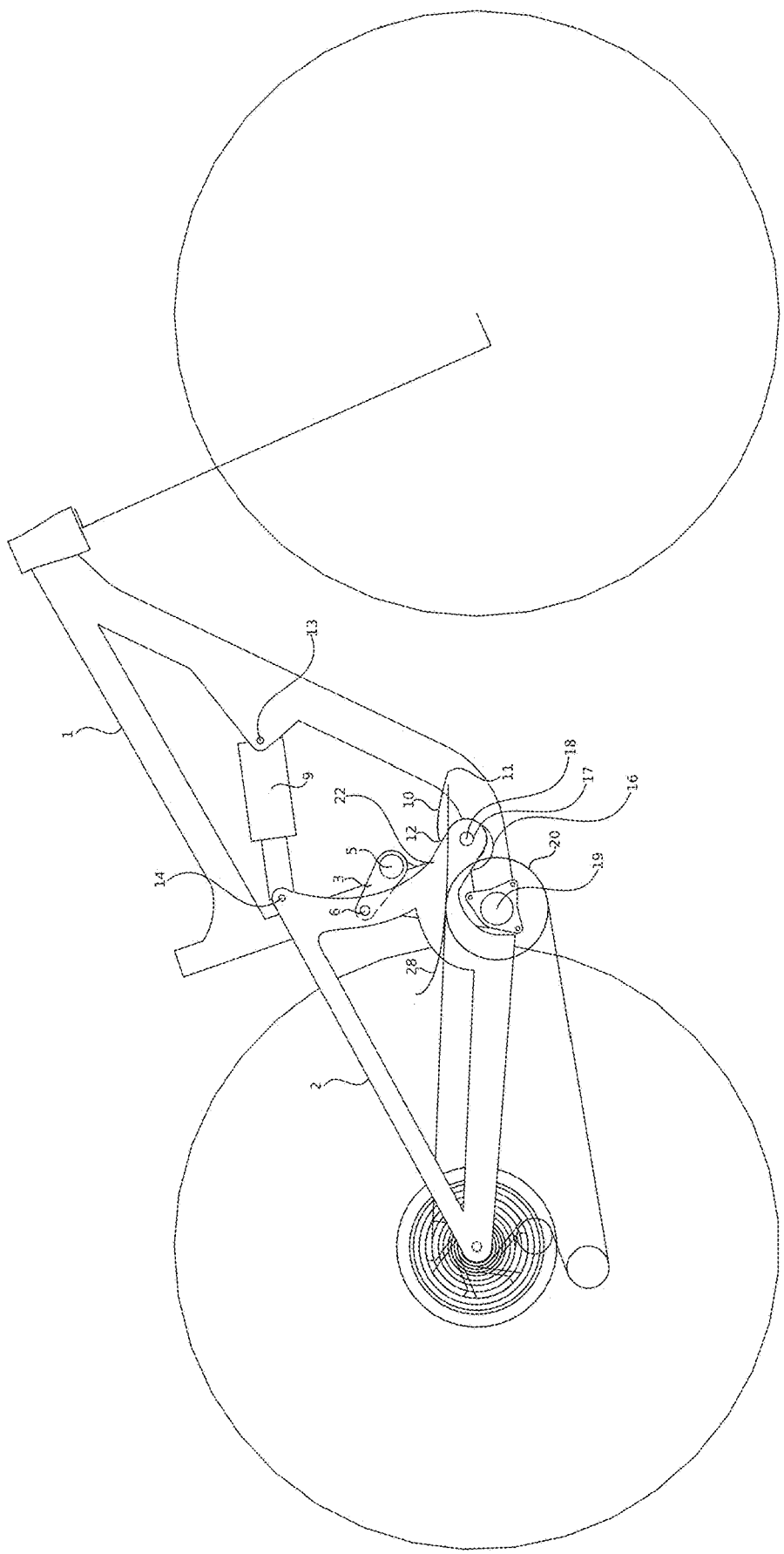
FIGS. 1bi and 1b are an illustration of the embodiment of FIG. 1 with the anti squat/instant center path line with the chain in a middle gear (24 tooth cog) of the rear cassette.
Figure 1B:
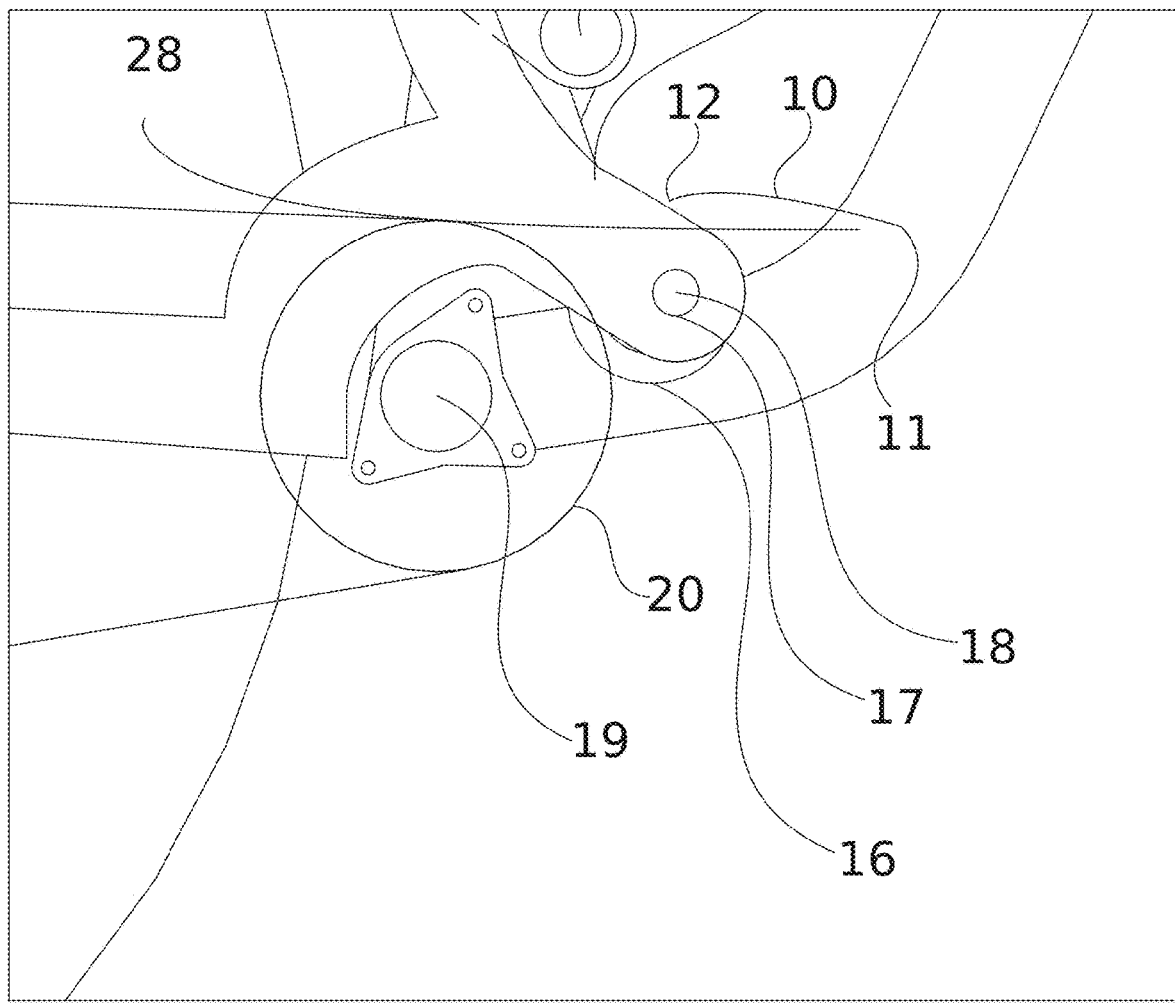

FIG. 1*b* is an illustration of the embodiment in FIG. 1 with the anti squat/instant center path line 28. Anti squat/instant center path line 28 in produced in the middle gear range, 32 tooth chainring and a 24 tooth cog. FIG. 1*b* is a close up of anti squat/instant center path line 28.

Figure 1C:
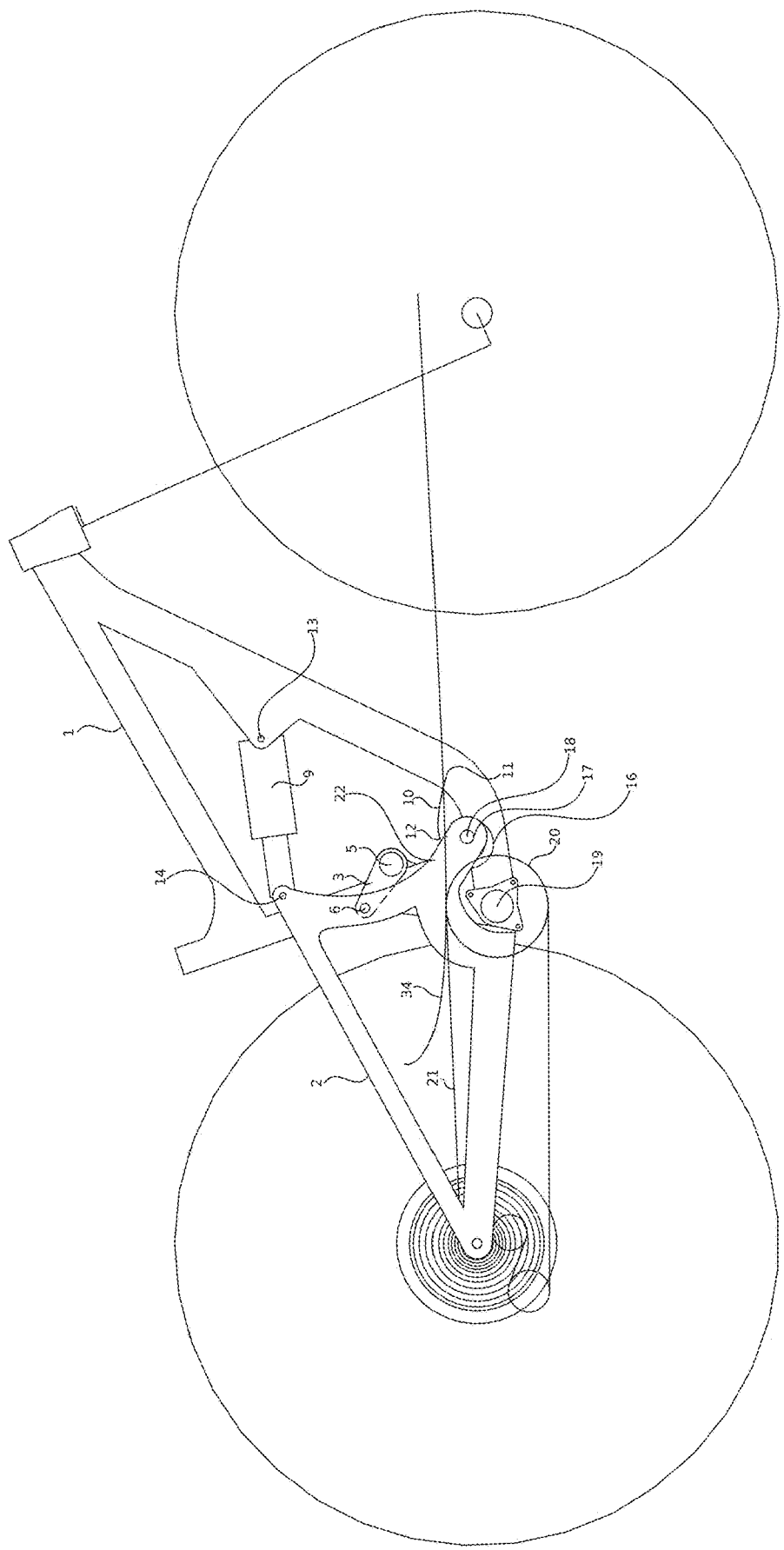
FIGS. 1ci and 1c are an illustration of the embodiment of FIG. 1 with the anti squat/instant center path line with the chain in the highest gear (10 tooth cog) of the rear cassette.
Figure 1C:
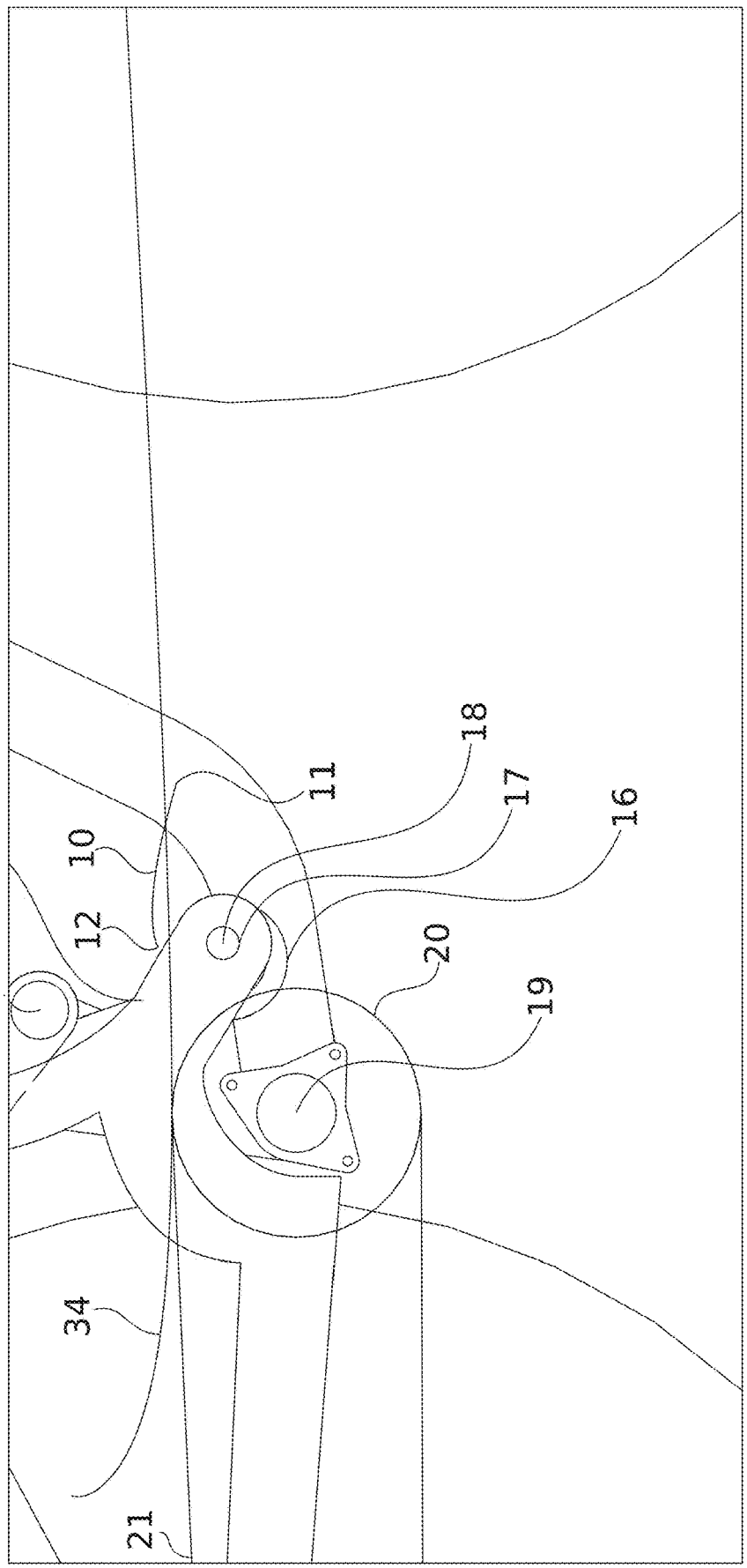
Figure 1E:
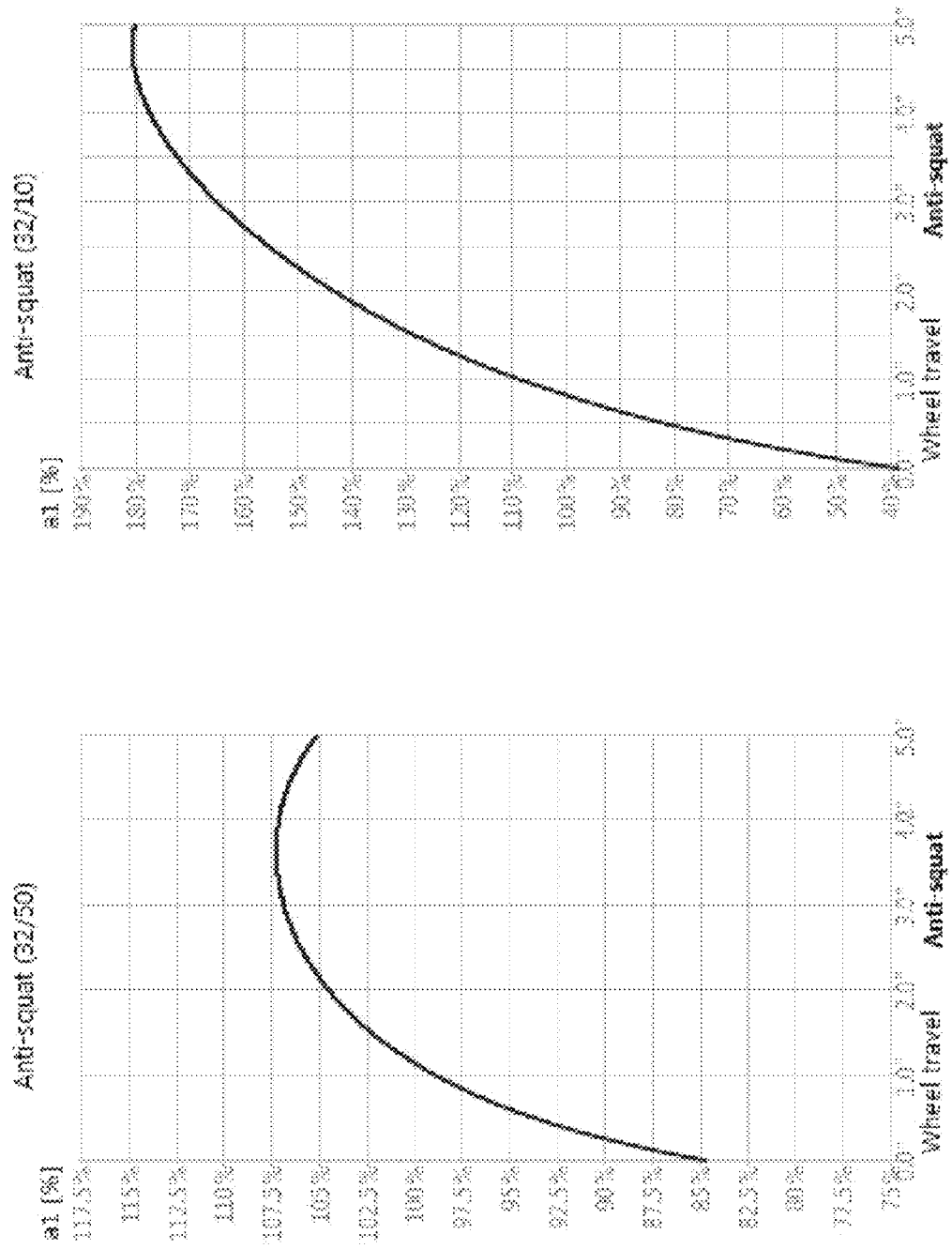
FIG. 1e is the anti squat graph produced by the embodiment in FIG. 1 for the lowest gear and the highest gear of the vehicle drivetrain.

FIG. 1*c* is an illustration of the embodiment in FIG. 1 with the anti squat/instant center path line 34. Anti squat/instant center path line 34 in produced in the highest gear range, 32 tooth chainring and a 10 tooth cog. FIG. 1*ci* is a close up of anti squat/instant center path line 34.

FIG. 1*d* is the anti rise graph produced from the IC (instant center) of the embodiment in FIG. 1. The anti rise percent values and shape of the line produce a suspension system that is responsive to rough terrain under braking and resist stiffening under braking. The rear suspension also resist rising as the mass shifts forward under braking conditions.

FIG. 1*c* is the anti squat graph produced by the embodiment in FIG. 1 for the lowest gear and the highest gear of the vehicle drivetrain. These are the extremes of the gear range and the gears that fall in-between will have a similar graph that produce the same suspension kinematics. These kinematic characteristics are as follows; anti squat starts below 100% and as the rear suspension compresses for more than half of the rear suspension travel anti squat will increase and toward the end of the rear suspension travel the anti squat will taper off level or slightly decrease. When these kinematics are combined with the front suspension cycling as the vehicle (bicycle) is ridden in reality with a person pedaling it the following events happen; anti squat starts low and the rider gets on the bike, the rear suspension compresses and anti squat increases, but the front suspension compresses as well and that cause anti squat to decrease slightly. The rider starts pedaling causing his weight to shift upwards and as the rider accelerates forward the rider weight also shifts rearward, both of these weight shifts cause anti squat to increase. That increase resists the suspension from compressing under the weight shift. The front wheel hits a bump in the terrain, causing the front suspension to compress and anti squat decreases. As the front suspension rebounds anti squat increases, returning toward its original value but the rear wheel now hits the bump and is compressing, thus slowing of anti squat growth and leveling or even slightly decreasing of anti squat come into play, this prevents the anti squat value from increasing too much causing the suspension to stiffen too much. It is the shape of the anti squat curve combined with the timing of the front suspension cycling that produces a more constant value of anti squat as both the front and rear suspension cycle through the suspension travel as the vehicle is ridden over terrain. This anti squat curve prevents anti squat values from being high at the start of the suspension travel so the suspension can be effective over rough terrain but also allows the suspension to have an effective anti squat value at the end of its travel as well. If the anti squat value is to low through the suspension travel, the suspension does not resist compression from the upward and rearward weight shift generated from the rider pedaling thus not being pedaling efficient. Shock damping has to be increased to compensate, resisting compression so that the vehicle is pedal efficient but the shock and this dampening are also the component in the suspension system that perform the duties of absorbing shock from the terrain. Thus increasing the damping to increase pedal efficiency also prevents the shock from absorbing shock thus decreasing efficiency over rough terrain. If anti squat values are too high through the suspension travel, pedaling over smooth terrain is efficient but over rough terrain chain torque produces too much anti squat causing the suspension to over stiffen and prevents the shock and dampener from absorbing shock.

Figure 2:
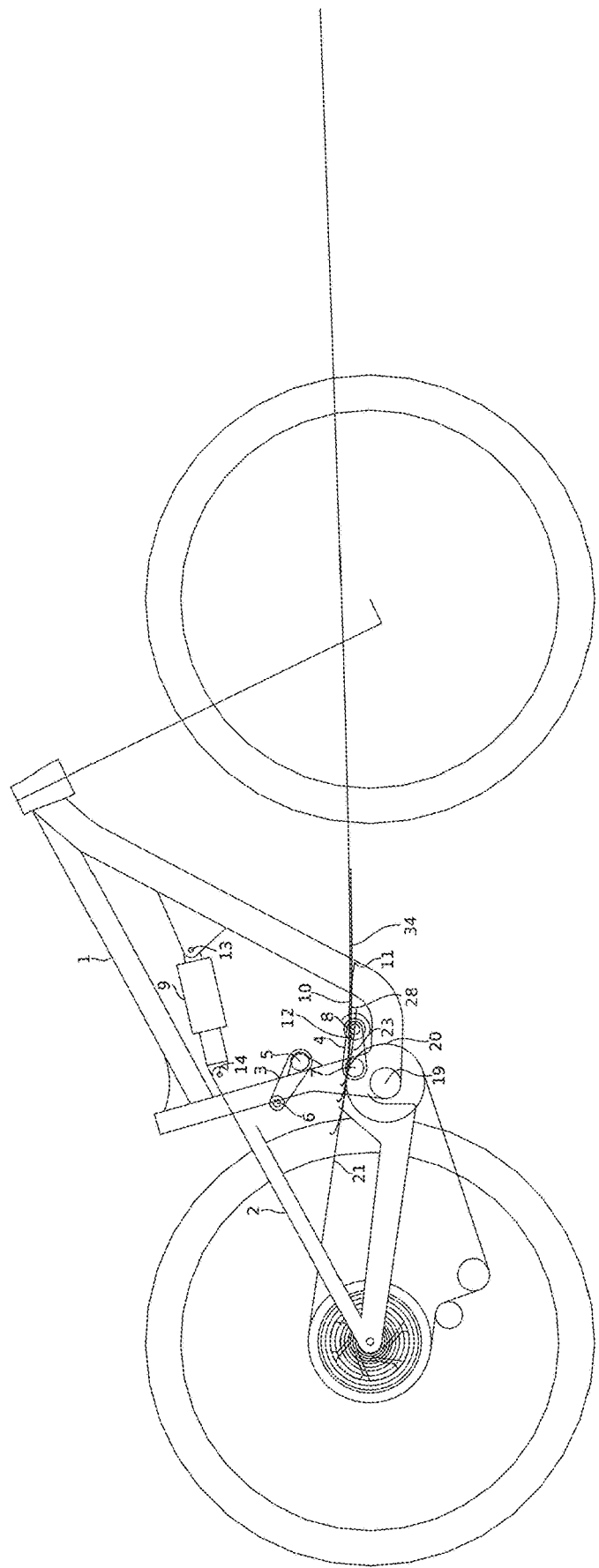
FIG. 2 is an illustration of a preferred embodiment of the invention.

FIG. 2 is an illustration of an embodiment of the invention. The embodiment of FIG. 1 has a front triangle 1 with a bottom bracket 19 and a rear triangle 2. The rear triangle 2 is connected to the front triangle 1 by the upper link 3 and an eccentric pivot 16 and the rear biasing member 9. The front pivot point 5 of the upper link 3 connects the upper link to front triangle 1 and the rear pivot point 6 of upper link 3 connects the rear triangle 2 to the upper link. The forward point 18 of the eccentric pivot 16 connects the eccentric pivot to the rear triangle 2 and the eccentric pivot 16 is connected to front triangle 1 at point 17. Eccentric pivot point 18 is in front of bottom bracket 19 and is generally in line or in front of the radius of the front chain ring 20 that rotates around the bottom bracket 19. The rear biasing member 9 is connected to the front triangle 1 at connection point 13 and is connected to the rear triangle 2 at connection point 14. When an imaginary line is drawn through rear pivot point 6 of the upper link 3 and front pivot point 5 of upper link and an imaginary line is drawn through eccentric connection point 17 and eccentric connection point 18 an intersecting point of these two imaginary lines is formed and denotes the IC of FIG. 1 when the biasing member 9 is in an non-compressed state. As the suspension system compresses the eccentric pivot rotates counter clockwise, causing the forward point 18 of the eccentric pivot to move upwards and the rear pivot point 6 of the upper link to move forward.

If imaginary lines are drawn through the pivot points 6 and 5 of the upper link 3 and through points 17 and 18 of the eccentric pivot 16 throughout the range of movement as the suspension compresses the IC can be plotted forming an IC path line 10 with an IC start point 11 and an IC end point 12. The IC path line starts in front of the front chainring 20 generally the same height as the radius of chainring 20 and moves rearward and upwards as the suspension compresses. This produces a group of anti squat/instant center path lines 22 for the entire gear range that are shaped as follows; the lines starts in front of the bottom bracket around the same height as the chainring radius and moves towards the rear of the vehicle in a convex manner. As the lines curve upward towards the seat at the end of the lines there are a more pronounced vertical curve upwards. This produces lines that has a j shaped bend at the end. Anti squat/instant center path line 23 is the path line produced with the front chainring and a 50 tooth count rear cog. Anti squat/instant center path line 24 is the path line produced with the front chainring and a 42 tooth count rear cog. Anti squat/instant center path line 25 is the path line produced with the front chainring and a 36 tooth count rear cog. Anti squat/instant center path line 26 is the path line produced with the front chainring and a 32 tooth count rear cog. Anti squat/instant center path line 27 is the path line produced with the front chainring and a 28 tooth count rear cog. Anti squat/instant center path line 28 is the path line produced with the front chainring and a 24 tooth count rear cog. Anti squat/instant center path line 29 is the path line produced with the front chainring and a 21 tooth count rear cog. Anti squat/instant center path line 30 is the path line produced with the front chainring and a 18 tooth count rear cog. Anti squat/instant center path line 31 is the path line produced with the front chainring and a 16 tooth count rear cog. Anti squat/instant center path line 32 is the path line produced with the front chainring and a 14 tooth count rear cog. Anti squat/instant center path line 33 is the path line produced with the front chainring and a 12 tooth count rear cog. Anti squat/instant center path line 34 is the path line produced with the front chainring and a 10 tooth count rear cog. Each of these anti squat/instant center path lines can be defined as having a bottom half or little more than half of a parabola that opens toward the front wheel. Each anti squat/instant center path line starts in front of the chainring radius and has its vertex at least 0.150 inches behind the bottom bracket and 2.835 inches above the bottom bracket, but no more than 8.1 inches behind the bottom bracket and 4.7 inches above the bottom bracket.

Figure 2B:
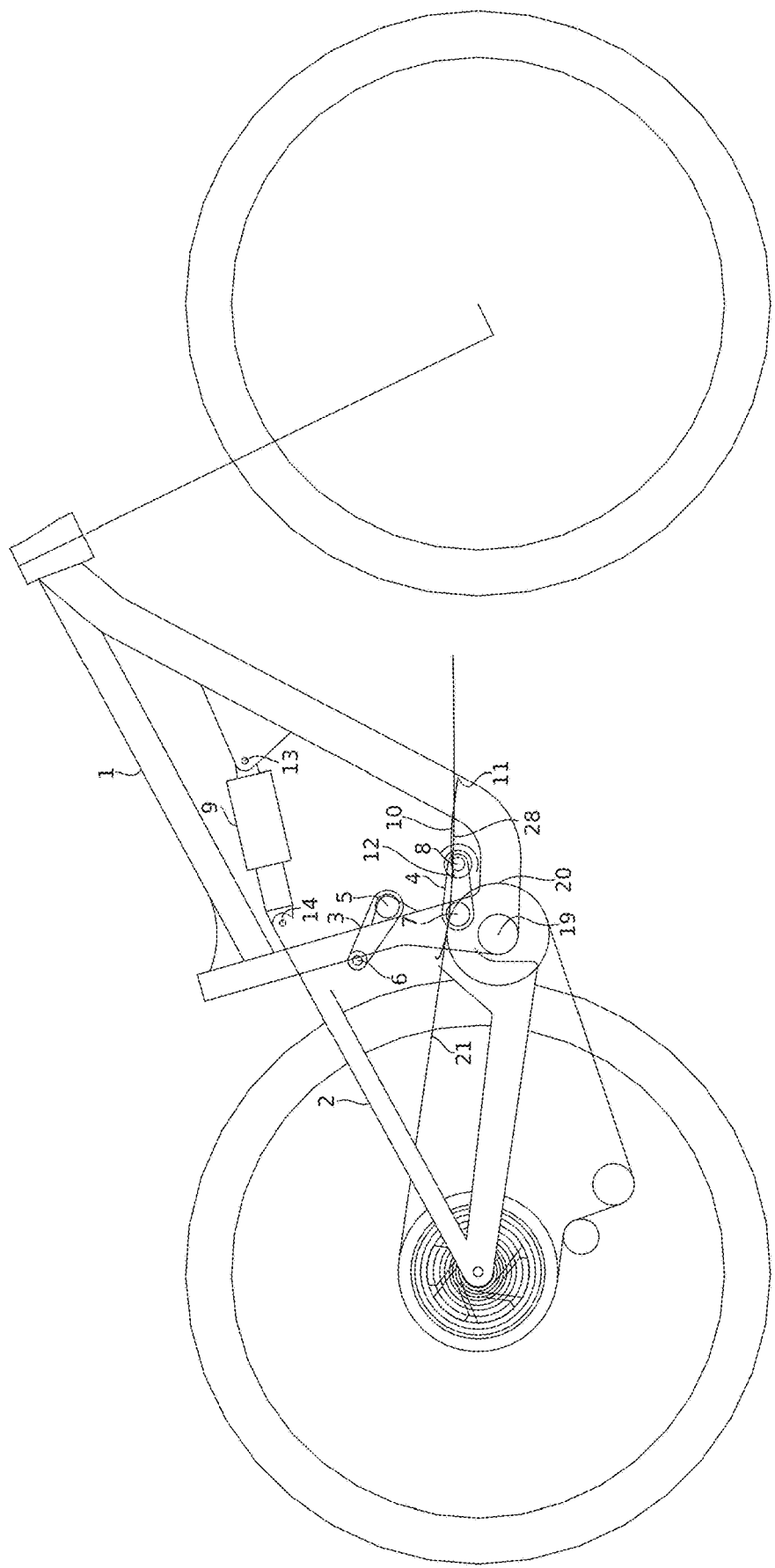
FIGS. 2bi and 2b is an illustration of the embodiment of FIG. 2 with the anti squat/instant center path line with the chain in a middle gear (24 tooth cog) of the rear cassette.
Figure 2B:
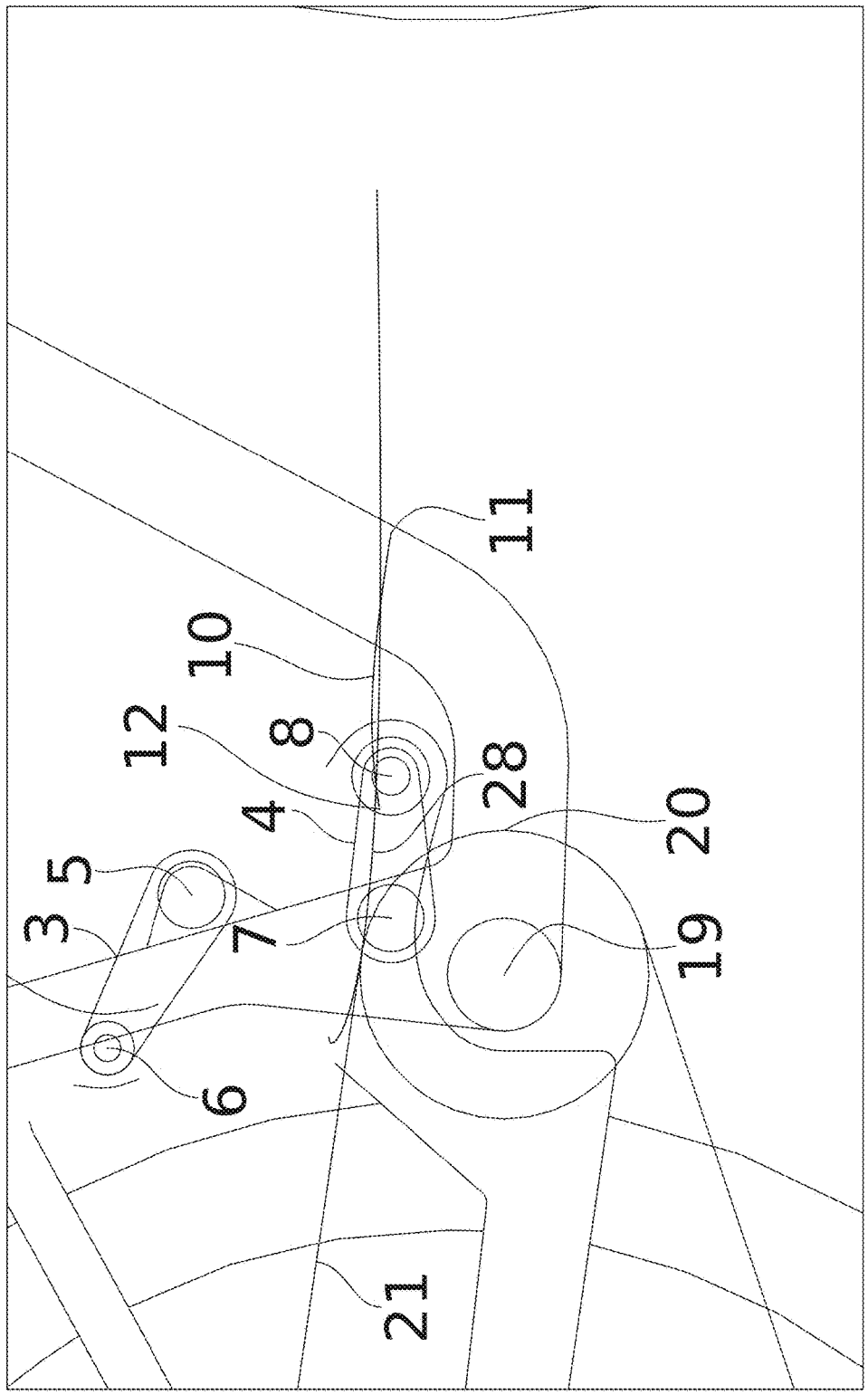
Figure 2C:
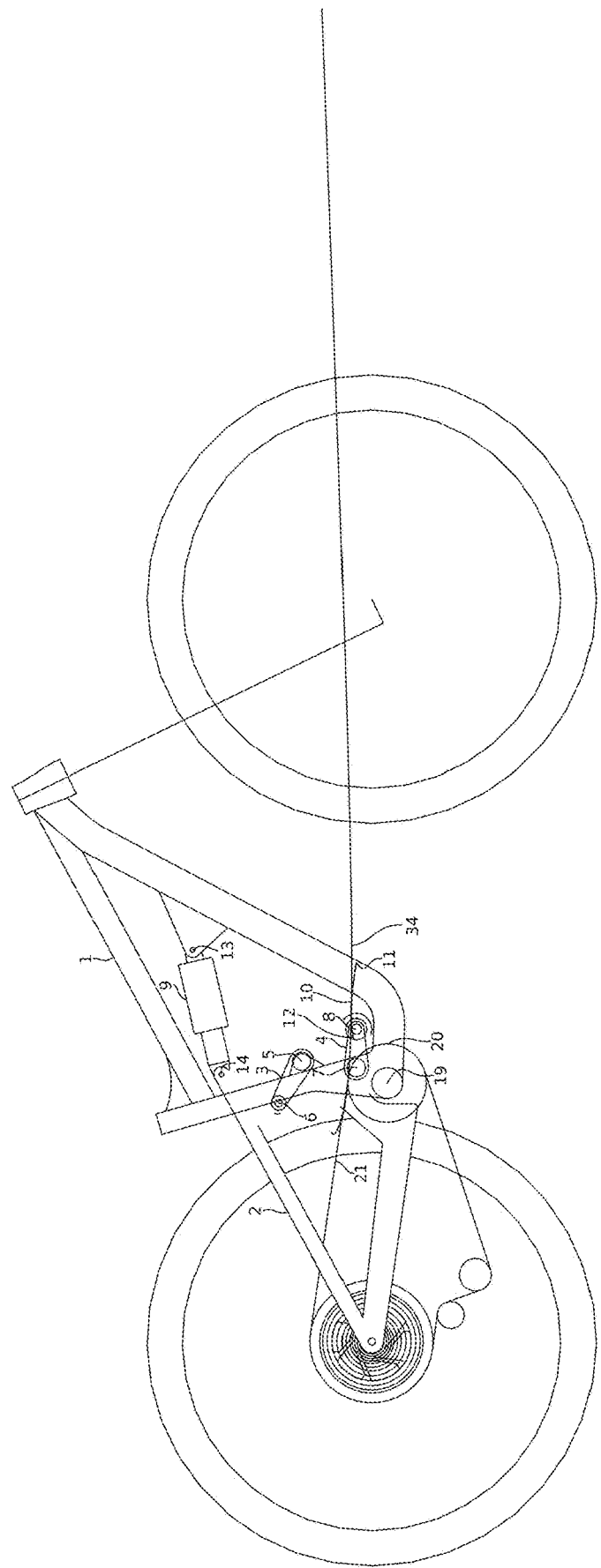
FIGS. 2ci and 2c is an illustration of the embodiment of FIG. 2 with the anti squat/instant center path line with the chain in the highest gear (10 tooth cog) of the rear cassette.
Figure 2C:
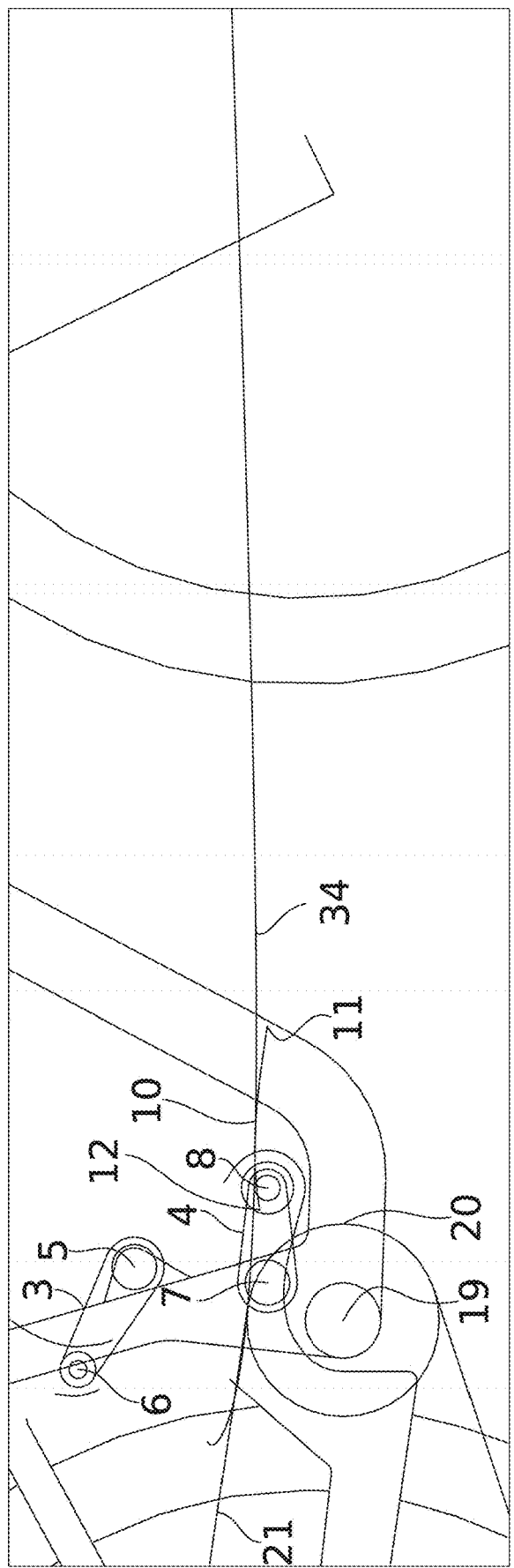
Figure 2D:
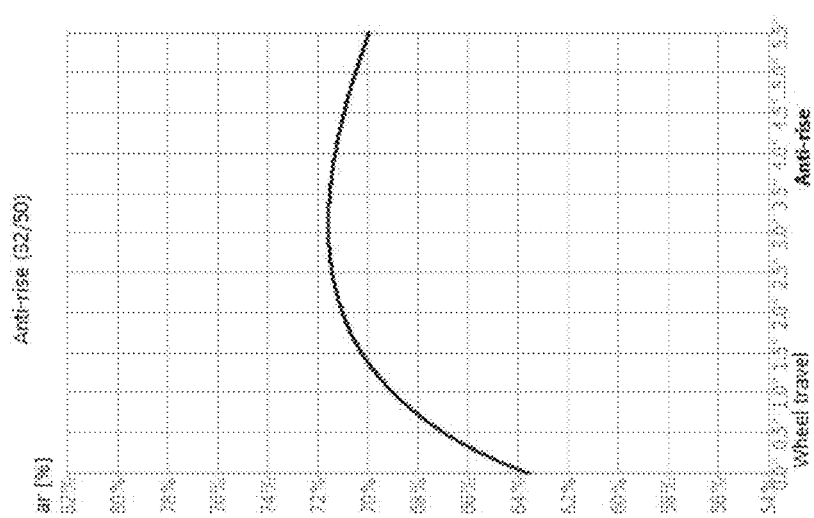
FIG. 2d is the anti rise graph produced from the IC (instant center) of the embodiment in FIG. 2.
Figure 2A:
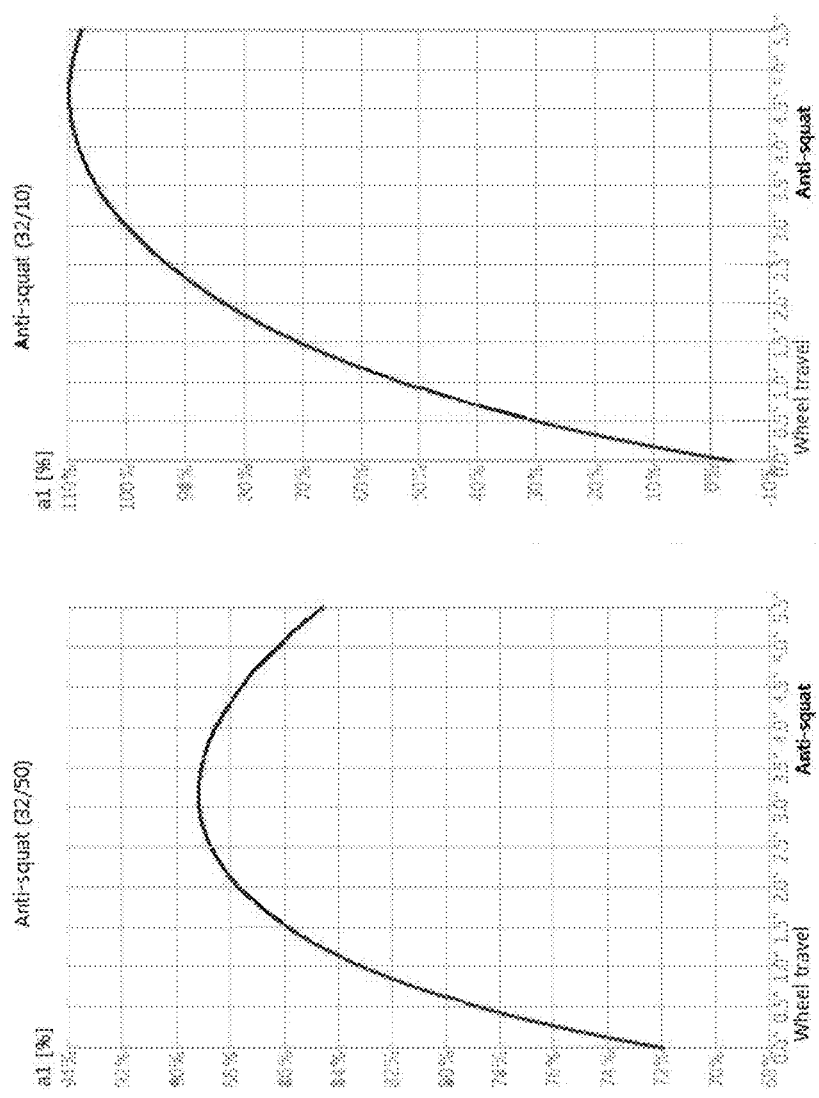
FIGS. 2ai and 2a is an illustration of the embodiment of FIG. 2 with the anti squat/instant center path line with the chain in the lowest gear (50 tooth cog) of the rear cassette.

FIG. 2a is an illustration of the embodiment in FIG. 2 with the anti squat/instant center path line 23. Anti squat/instant center path line 23 in produced in the lowest gear range, 32 tooth chainring and a 50 tooth cog. FIG. 2ai is a close up of anti squat/instant center path line 23.

FIG. 2b is an illustration of the embodiment in FIG. 2 with the anti squat/instant center path line 28. Anti squat/instant center path line 28 in produced in the middle gear range, 32 tooth chainring and a 24 tooth cog. FIG. 2bi is a close up of anti squat/instant center path line 28.

FIG. 2c is an illustration of the embodiment in FIG. 2 with the anti squat/instant center path line 34. Anti squat/instant center path line 34 in produced in the highest gear range, 32 tooth chainring and a 10 tooth cog. FIG. 2ci is a close up of anti squat/instant center path line 34.

FIG. 2d is the anti rise graph produced from the IC (instant center) of the embodiment in FIG. 1. The anti rise percent values and shape of the line produce a suspension system that is responsive to rough terrain under braking and resist stiffening under braking. The rear suspension also resist rising as the mass shifts forward under braking conditions.

FIG. 2e is the anti squat graph produced by the embodiment in FIG. 1 for the lowest gear and the highest gear of the vehicle drivetrain. These are the extremes of the gear range and the gears that fall in-between will have a similar graph that produce the same suspension kinematics. These kinematic characteristics are as follows; anti squat starts below 100% and as the rear suspension compresses for more than half of the rear suspension travel anti squat will increase and toward the end of the rear suspension travel the anti squat will tapper off level or slightly decrease. When these kinematics are combined with the front suspension cycling as the vehicle (bicycle) is ridden in reality with a person pedaling it the following events happen; anti squat starts low and the rider gets on the bike, the rear suspension compresses and anti squat increases, but the front suspension compresses as well and that cause anti squat to decrease slightly. The rider starts pedaling causing his weight to shift upwards and as the rider accelerates forward the rider weight shifts rearward, both of these weight shifts cause anti squat to increase. That increase resist the suspension from compressing under the weight shift. The front wheel hit a bump in the terrain, causing the front suspension to compress and anti squat decreases. As the front suspension rebounds anti squat increases, returning towards its original value but the rear wheel is now hits the bump and is compressing, this is where the slowing of anti squat growth and leveling or even slightly decreasing of anti squat come into play, this prevents the anti squat value from increasing too much causing the suspension to stiffen too much. It is the shape of the anti squat curve combined with the timing of the front suspension cycling that produces a more constant value of anti squat as both the front and rear suspension cycle through the suspension travel as the vehicle is ridden over terrain. This anti squat curve prevents anti squat values from being high at the start of the suspension travel so the suspension can be effective over rough terrain but also allows the suspension to have an effective anti squat value at the end of its travel as well. If the anti squat value is to low through the suspension travel the suspension does not resist compression from the upward and rearward weight shift generated from the rider pedaling thus not being pedaling efficient and the shock damping has to be increased to compensate, resisting compression so that the vehicle is pedal efficient but the shock and this dampening are also the component in the suspension system that perform the duties of absorbing shock from the terrain so increasing the damping to increase pedal efficiency also prevents the shock from absorbing shock decreasing efficiency over rough terrain. If anti squat values are to high through the suspension travel then pedaling over smooth terrain is efficient but over rough terrain chain torque produces too much anti squat causing the suspension to over stiffen and prevents the shock and dampener from absorbing shock.

Figure 3:
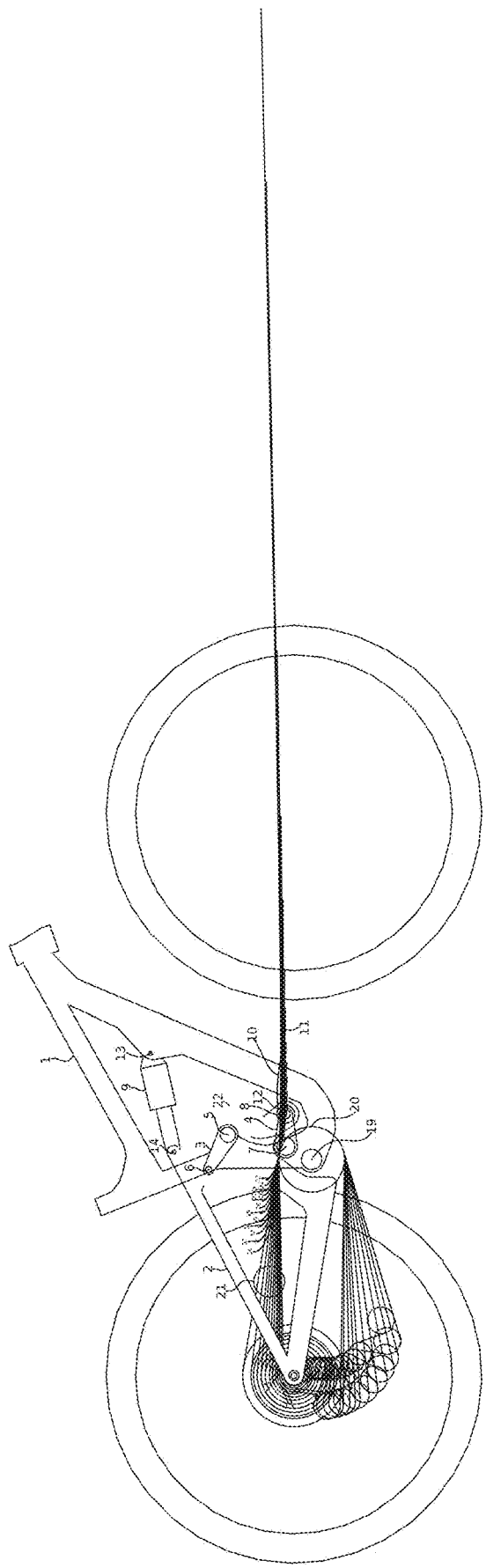
FIG. 3 is an illustration of a preferred embodiment of the invention.

FIG. 3 is an illustration of an embodiment of the invention. The embodiment of FIG. 3 has a front triangle 1 with a bottom bracket 19 and a rear triangle 2. The rear triangle 2 is connected to the front triangle 1 by the upper link 3 and a lower link 4 and the rear biasing member 9. The front pivot point 5 of the upper link 3 connects the upper link to front triangle 1 and the rear pivot point 6 of upper link 3 connects the rear triangle 2 to the upper link. The forward pivot point 8 of the lower link 4 connects to the rear triangle 2 and the pivot point 7 of lower link 4 is connects front triangle 1 to lower link 4. Lower link pivot point 8 is in front of bottom bracket 19 and is generally in line or in front of the radius of the front chain ring 20 that rotates around the bottom bracket 19. The rear biasing member 9 is connected to the front triangle 1 at connection point 13 and is connected to the rear triangle 2 at connection point 14. When an imaginary line is drawn through rear pivot point 6 of the upper link 3 and front pivot point 5 of upper link and an imaginary line is drawn through pivot point 7 and pivot point 8 of lower link 4 an intersecting point of these two imaginary lines is formed and denotes the IC of FIG. 3 when the biasing member 9 is in an non-compressed state. As the suspension system compresses the lower link 4 rotates counter clockwise, causing the forward pivot point 8 of the lower link 4 to move upwards and the rear pivot point 6 of the upper link to move forward.

If imaginary lines are drawn through the pivot points 6 and 5 of the upper link 3 and through points 7 and 8 of the lower link 4 throughout the range of movement as the suspension compresses the IC can be plotted forming an IC path line 10 with an IC start point 11 and an IC end point 12. The IC path line starts in front of the front chainring 20 generally the same height as the radius of chainring 20 and moves rearward and upwards as the suspension compresses for the first half of the IC path line but then continues to move rearward and downward for the last half of the IC path line. This forms an IC path line that has a parabola like shape with the start point 11 and the end point 12 generally the same height as one another. This produces a group of anti squat/instant center path lines 22 that are shaped as follows; the lines starts in front of the bottom bracket around the same height as the chainring radius and moves towards the rear of the vehicle in a convex manner. As the lines curve upward towards the seat at the end of the lines there are a more pronounced vertical curve upwards. This produces lines that has a generally j shaped bend at the end. Anti squat/instant center path line 23 is the path line produced with the front chainring and a 50 tooth count rear cog. Anti squat/instant center path line 24 is the path line produced with the front chainring and a 42 tooth count rear cog. Anti squat/instant center path line 25 is the path line produced with the front chainring and a 36 tooth count rear cog. Anti squat/instant center path line 26 is the path line produced with the front chainring and a 32 tooth count rear cog. Anti squat/instant center path line 27 is the path line produced with the front chainring and a 28 tooth count rear cog. Anti squat/instant center path line 28 is the path line produced with the front chainring and a 24 tooth count rear cog. Anti squat/instant center path line 29 is the path line produced with the front chainring and a 21 tooth count rear cog. Anti squat/instant center path line 30 is the path line produced with the front chainring and a 18 tooth count rear cog. Anti squat/instant center path line 31 is the path line produced with the front chainring and a 16 tooth count rear cog. Anti squat/instant center path line 32 is the path line produced with the front chainring and a 14 tooth count rear cog. Anti squat/instant center path line 33 is the path line produced with the front chainring and a 12 tooth count rear cog. Anti squat/instant center path line 34 is the path line produced with the front chainring and a 10 tooth count rear cog. Each of these anti squat/instant center path lines can be defined as having a bottom half or little more than half of a parabola that opens toward the front wheel. Each anti squat/instant center path line starts in front of the chainring radius and has its vertex at least 0.150 inches behind the bottom bracket and 2.835 inches above the bottom bracket, but no more than 8.1 inches behind the bottom bracket and 4.7 inches above the bottom bracket.

Figure 3A:
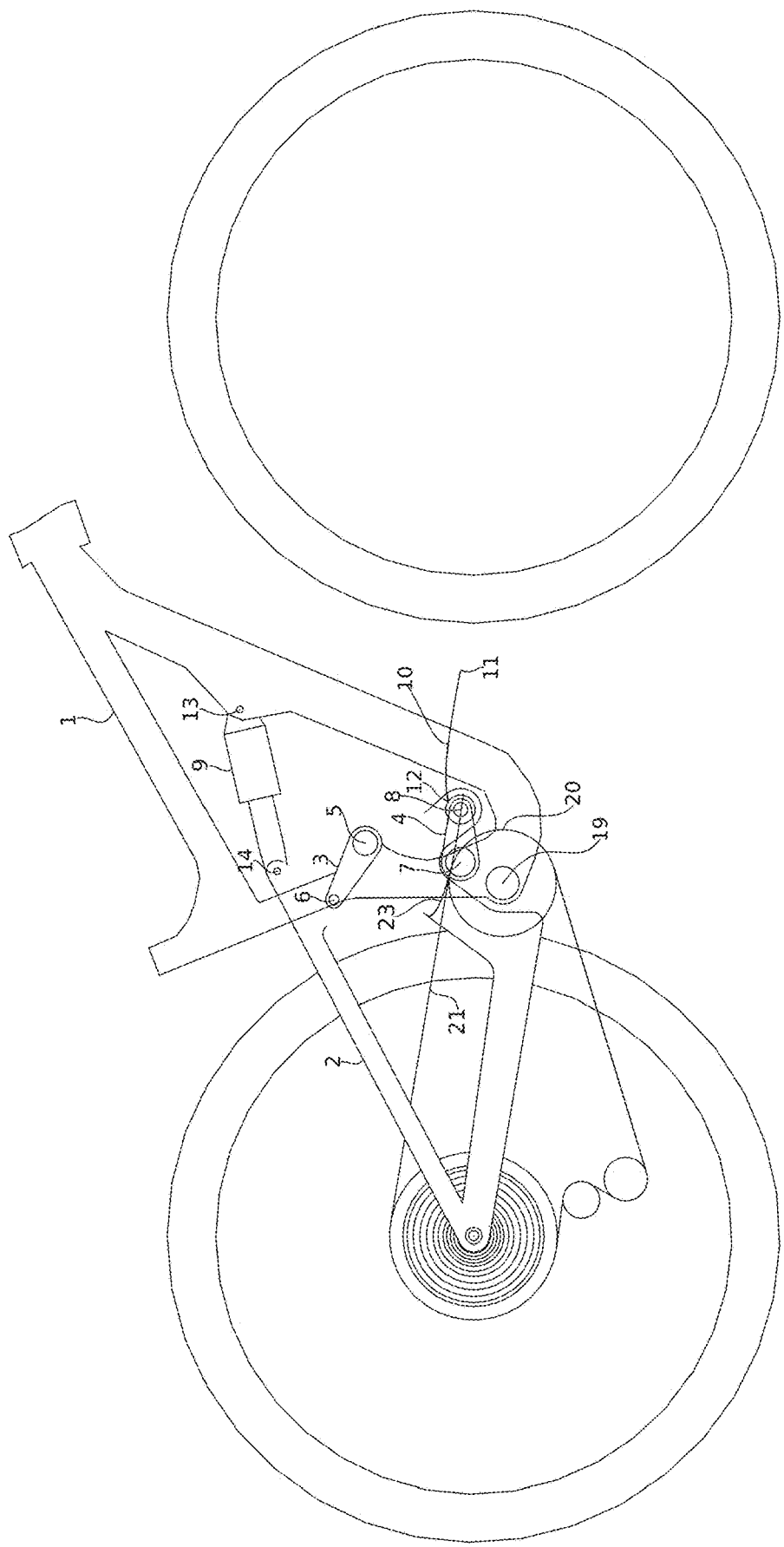
FIGS. 3ai and 3a is an illustration of the embodiment of FIG. 3 with the anti squat/instant center path line with the chain in the lowest gear (50 tooth cog) of the rear cassette.

FIG. 3a is an illustration of the embodiment in FIG. 3 with the anti squat/instant center path line 23. Anti squat/instant center path line 23 in produced in the lowest gear range, 32 tooth chainring and a 50 tooth cog. FIG. 3ai is a close up of anti squat/instant center path line 23.

Figure 3B:
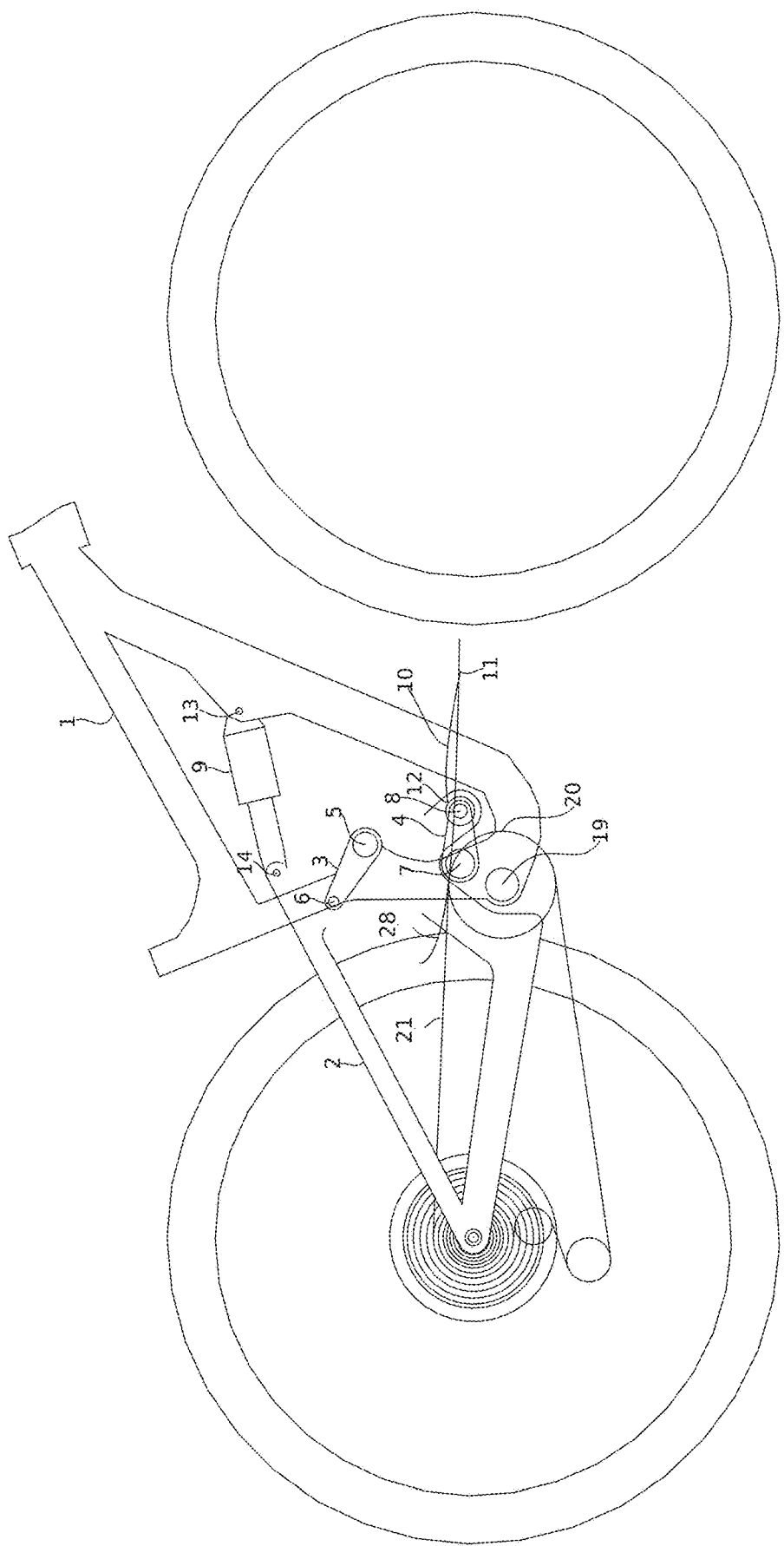
FIGS. 3bi and 3b is an illustration of the embodiment of FIG. 3 with the anti squat/instant center path line with the chain in a middle gear (24 tooth cog) of the rear cassette.

FIG. 3b is an illustration of the embodiment in FIG. 2 with the anti squat/instant center path line 28. Anti squat/instant center path line 28 in produced in the middle gear range, 32 tooth chainring and a 24 tooth cog. FIG. 3bi is a close up of anti squat/instant center path line 28.

Figure 3C:
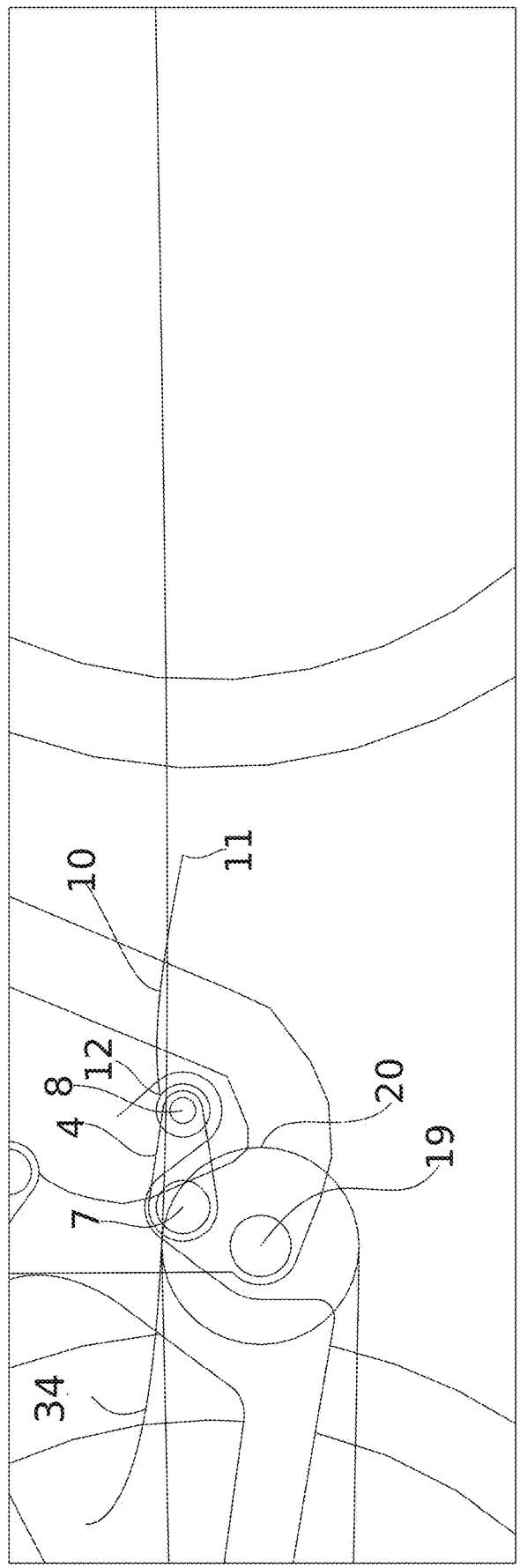
FIGS. 3ci and 3c is an illustration of the embodiment of FIG. 3 with the anti squat/instant center path line with the chain in the highest gear (10 tooth cog) of the rear cassette.

FIG. 3c is an illustration of the embodiment in FIG. 2 with the anti squat/instant center path line 34. Anti squat/instant center path line 34 in produced in the highest gear range, 32 tooth chainring and a 10 tooth cog. FIG. 3ci is a close up of anti squat/instant center path line 34.

FIG. 3e is the anti rise graph produced from the IC (instant center) of the embodiment in FIG. 3. The anti rise percent values and shape of the line produce a suspension system that is responsive to rough terrain under braking and resist stiffening under braking. The rear suspension also resist rising as the mass shifts forward under braking conditions.

Figure 3D:
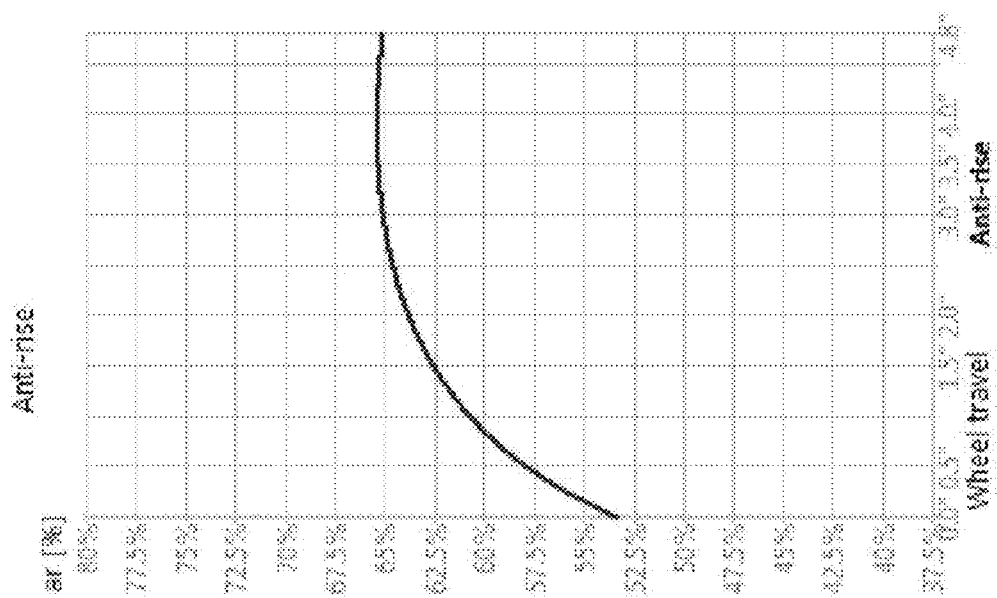
FIG. 3d is the anti rise graph produced from the IC (instant center) of the embodiment in FIG. 3.
Figure 3A:
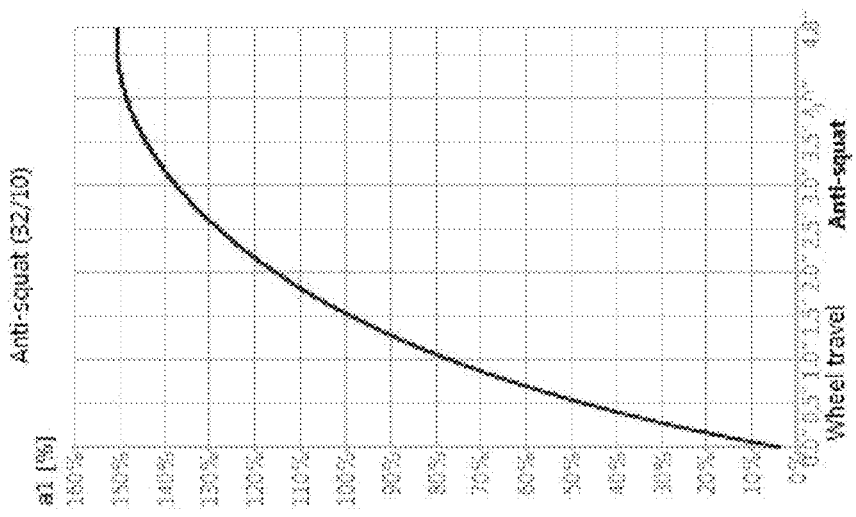
Figure 3A:
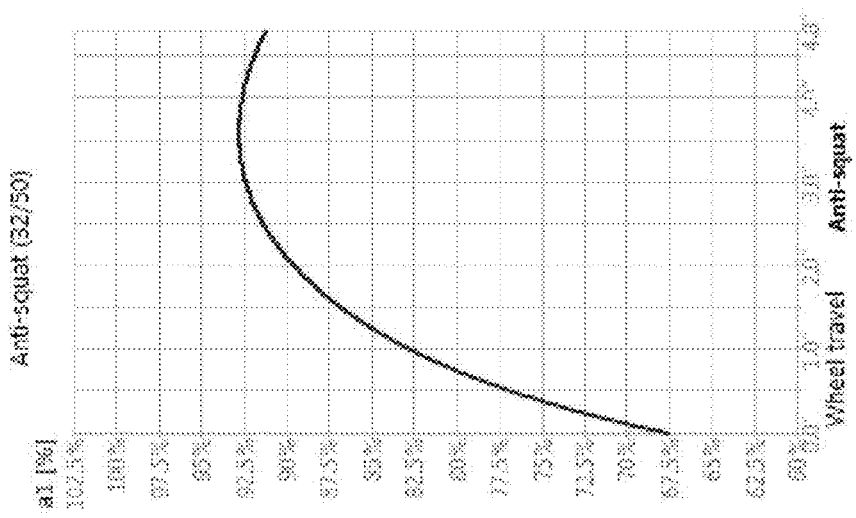

FIG. 3d is the anti squat graph produced by the embodiment in FIG. 3 for the lowest gear and the highest gear of the vehicle drivetrain. These are the extremes of the gear range and the gears that fall in-between will have a similar graph that produce the same suspension kinematics. These kinematic characteristics are as follows; anti squat starts below 100% and as the rear suspension compresses for more than half of the rear suspension travel anti squat will increase and toward the end of the rear suspension travel the anti squat will tapper off level or slightly decrease. When these kinematics are combined with the front suspension cycling as the vehicle (bicycle) is ridden in reality with a person pedaling it the following events happen; anti squat starts low and the rider gets on the bike, the rear suspension compresses and anti squat increases, but the front suspension compresses as well and that cause anti squat to decrease slightly. The rider starts pedaling causing his weight to shift upwards and as the rider accelerates forward the rider weight shifts rearward, both of these weight shifts cause anti squat to increase. That increase resist the suspension from compressing under the weight shift. The front wheel hit a bump in the terrain, causing the front suspension to compress and anti squat decreases. As the front suspension rebounds anti squat increases, returning towards its original value but the rear wheel is now hits the bump and is compressing, this is where the slowing of anti squat growth and leveling or even slightly decreasing of anti squat come into play, this prevents the anti squat value from increasing too much causing the suspension to stiffen too much. It is the shape of the anti squat curve combined with the timing of the front suspension cycling that produces a more constant value of anti squat as both the front and rear suspension cycle through the suspension travel as the vehicle is ridden over terrain. This anti squat curve prevents anti squat values from being high at the start of the suspension travel so the suspension can be effective over rough terrain but also allows the suspension to have an effective anti squat value at the end of its travel as well. If the anti squat value is to low through the suspension travel the suspension does not resist compression from the upward and rearward weight shift generated from the rider pedaling thus not being pedaling efficient and the shock damping has to be increased to compensate, resisting compression so that the vehicle is pedal efficient but the shock and this dampening are also the component in the suspension system that perform the duties of absorbing shock from the terrain so increasing the damping to increase pedal efficiency also prevents the shock from absorbing shock decreasing efficiency over rough terrain. If anti squat values are to high through the suspension travel then pedaling over smooth terrain is efficient but over rough terrain chain torque produces too much anti squat causing the suspension to over stiffen and prevents the shock and dampener from absorbing shock.

While certain exemplary embodiments are shown in the Figures and described in this disclosure, it is to be distinctly understood that the presently disclosed inventive concept(s) is not limited thereto but may be variously embodied to practice within the scope of this disclosure. From the foregoing description, it will be apparent that various changes may be made without departing from the spirit and scope of the disclosure as defined herein.

I claim:

1. A rear wheel suspension system for a two-wheeled vehicle having a seat, the suspension system comprising:
a rear triangle,
a front triangle,
an upper linkage, wherein said rear triangle being connected to said upper linkage by a first pivot member and said front triangle being connected to said upper linkage by a second pivot member;
a rear wheel having a rear axle, said rear wheel coupled to said rear triangle;
a cassette comprising a plurality of different sized gears and attached to said rear wheel;
a bottom bracket mounted to said front triangle, said bottom bracket being structured to house a pedal assembly, wherein said bottom bracket comprises a chainring mounted on said bottom bracket so as a center of said chainring is at a center of said bottom bracket;
an endless chain extending between said bottom bracket and said cassette, wherein said endless chain is configured to be shifted between said different sized gears of said cassette;
a biasing member connected to said front triangle and functionally connected to said rear triangle, said biasing member structured to be compressed in response to a force applied to said rear wheel;
wherein said front triangle is pivotally connected to said rear triangle at a rear triangle pivot point on said rear triangle;
wherein said bicycle suspension is characterized in that each of said gears of said cassette have an anti squat/instant center path line that begins forward of the bottom bracket and at or near the height of the uppermost chain ring radius and moves toward said rear axle, as the line moves toward the rear axle the line curves upward toward the seat of the two wheeled vehicle and progressively curves to form a more pronounced curve upward making a vertically of the line and a hook shape.

2. The rear wheel suspension system for a two-wheeled vehicle of claim 1, wherein said anti squat/instant center path line begins in front of a front wheel of said two-wheeled vehicle.

3. The rear wheel suspension system for a two-wheeled vehicle of claim 1 further comprising a lower linkage, said rear triangle being connected to said lower linkage at said rear triangle pivot point, wherein said lower linkage is connected to said front triangle at a front triangle pivot point.

4. The rear wheel suspension system for a two-wheeled vehicle of claim 1, wherein said biasing member is directly connected to said rear triangle.

5. The rear wheel suspension system for a two-wheeled vehicle of claim 1, wherein said biasing member is functionally connected to said rear triangle via said upper linkage.

6. The rear wheel suspension system for a two-wheeled vehicle of claim 1, wherein said pivot point connecting said rear triangle to said front triangle comprises an eccentric pivot.

7. The rear wheel suspension of claim 1, wherein the vehicle is a bicycle.

8. The rear wheel suspension system for a two wheeled vehicle of claim 1, wherein said biasing member is functionally connected to said rear triangle and connected to said front triangle in a generally vertical orientation when said two wheeled vehicle is oriented in an upright position.

9. The rear wheel suspension system for a two wheeled vehicle of claim 1, wherein said biasing member is functionally connected to said rear triangle and connected to said front triangle in a generally horizontal orientation when said two wheeled vehicle is oriented in an upright position.

10. The rear wheel suspension system for a two wheeled vehicle of claim 5, wherein said upper linkage comprises a generally triangular shape.

11. The rear wheel suspension system for a two wheeled vehicle of claim 1, wherein said chainring attached to said bottom bracket comprises a chainring radius, wherein said anti squat/instant center path line defines a partial parabola that begins in front of said chainring radius and has a vertex at least 0.150 inches behind the bottom bracket and 2.835 inches above the bottom bracket, but no more than 8.1 inches behind the bottom bracket and 4.7 inches above the bottom bracket.

12. A rear wheel suspension system for a two-wheeled vehicle having a seat, the suspension system comprising:
a rear triangle,
a front triangle,
an upper linkage, wherein said rear triangle being connected to said upper linkage by a first pivot member and said front triangle being connected to said upper linkage by a second pivot member;
a rear wheel having a rear axle, said rear wheel coupled to said rear triangle;
a cassette comprising a plurality of different sized gears and attached to said rear wheel;
a bottom bracket mounted to said front triangle, said bottom bracket being structured to house a pedal assembly, wherein said bottom bracket comprises a chainring mounted on said bottom bracket so as a center of said chainring is at a center of said bottom bracket;
an endless chain extending between said bottom bracket and said cassette, wherein said endless chain is configured to be shifted between said different sized gears of said cassette;
a biasing member connected to said front triangle and functionally connected to said rear triangle, said biasing member structured to be compressed in response to a force applied to said rear wheel;
wherein said front triangle is pivotally connected to said rear triangle at a rear triangle pivot point on said rear triangle;
wherein said bicycle suspension is characterized in that when said biasing member is in a non-compressed state each of said gears of said cassette have an anti squat/instant center path line that begins forward of the bottom bracket and at or near the height of the uppermost chain ring radius and moves toward said rear axle, as the line moves toward the rear axle the line curves upward toward the seat of the two wheeled vehicle and progressively curves to form a more pronounced curve upward making a vertically of the line and a hook shape.

13. The rear wheel suspension system for a two-wheeled vehicle of claim 12, wherein said anti squat/instant center path line begins in front of a front wheel of said two-wheeled vehicle.

14. The rear wheel suspension system for a two-wheeled vehicle of claim 12 further comprising a lower linkage, said rear triangle being connected to said lower linkage at said rear triangle pivot point, wherein said lower linkage is connected to said front triangle at a front triangle pivot point.

15. The rear wheel suspension system for a two-wheeled vehicle of claim 12, wherein said biasing member is directly connected to said rear triangle.

16. The rear wheel suspension system for a two-wheeled vehicle of claim 12, wherein said biasing member is functionally connected to said rear triangle via said upper linkage.

17. The rear wheel suspension system for a two-wheeled vehicle of claim 12, wherein said pivot point connecting said rear triangle to said front triangle comprises an eccentric pivot.

18. The rear wheel suspension system for a two wheeled vehicle of claim 12, wherein said biasing member is functionally connected to said rear triangle and connected to said front triangle in a generally vertical orientation when said two wheeled vehicle is oriented in an upright position.

19. The rear wheel suspension system for a two wheeled vehicle of claim 12, wherein said biasing member is functionally connected to said rear triangle and connected to said front triangle in a generally horizontal orientation when said two wheeled vehicle is oriented in an upright position.

20. The rear wheel suspension system for a two wheeled vehicle of claim 12, wherein said chainring attached to said bottom bracket comprises a chainring radius, wherein said anti squat/instant center path line defines a partial parabola that begins in front of said chainring radius and has a vertex at least 0.150 inches behind the bottom bracket and 2.835 inches above the bottom bracket, but no more than 8.1 inches behind the bottom bracket and 4.7 inches above the bottom bracket.

* * * * *